US010569530B2

(12) United States Patent
Robinson et al.

(10) Patent No.: US 10,569,530 B2
(45) Date of Patent: Feb. 25, 2020

(54) THREADABLE HEAT TRANSFER PRESS WITH HEATED LOWER PLATEN

(71) Applicant: Stahls' Inc., Sterling Heights, MI (US)

(72) Inventors: Benjamin B. Robinson, Smithfield, PA (US); Richard S. Antoszewski, Glenshaw, PA (US); Weiyu Zhang, Washington, PA (US)

(73) Assignee: Stahls' Inc., Sterling Heights, MI (US)

( * ) Notice: Subject to any disclaimer, the term of this patent is extended or adjusted under 35 U.S.C. 154(b) by 0 days.

(21) Appl. No.: 16/059,457

(22) Filed: Aug. 9, 2018

(65) Prior Publication Data

US 2018/0361730 A1 Dec. 20, 2018

Related U.S. Application Data

(63) Continuation-in-part of application No. 15/720,108, filed on Sep. 29, 2017, which is a continuation-in-part of application No. 15/419,742, filed on Jan. 30, 2017, now Pat. No. 10,065,409, which is a continuation of application No. 13/787,157, filed on Mar. 6, 2013, now Pat. No. 9,573,332.

(60) Provisional application No. 61/654,486, filed on Jun. 1, 2012, provisional application No. 61/607,169, filed on Mar. 6, 2012.

(51) Int. Cl.

| | |
|---|---|
| ***B32B 7/00*** | (2019.01) |
| ***B41F 16/02*** | (2006.01) |
| ***B30B 15/26*** | (2006.01) |
| ***B30B 9/00*** | (2006.01) |

(52) U.S. Cl.

CPC ................ *B41F 16/02* (2013.01); *B30B 9/00* (2013.01); *B30B 15/26* (2013.01)

(58) Field of Classification Search

CPC ... B30B 1/12; B30B 9/00; B30B 15/26; B41F 16/02; B41F 16/0046

USPC .............................................. 156/359, 583.1

See application file for complete search history.

(56) References Cited

U.S. PATENT DOCUMENTS

| | | | |
|---|---|---|---|
| 3,154,009 | A | 10/1964 | Dewyer |
| 4,030,962 | A | 6/1977 | Fitzwater |
| 4,152,193 | A | 5/1979 | Fitzwater |
| 4,294,641 | A | 10/1981 | Reed et al. |

(Continued)

FOREIGN PATENT DOCUMENTS

| | | | |
|---|---|---|---|
| FR | 2691099 | A1 | 11/1993 |
| GB | 1079431 | A | 8/1967 |
| WO | 96/01730 | A1 | 1/1996 |

OTHER PUBLICATIONS

English Translation of FR 2691099.

STX-BH Heater Specification-Hotronix 1x20 Platen; A 2-1029 B, Color Specification.

*Primary Examiner* — James D Sells

(74) *Attorney, Agent, or Firm* — Fishman Stewart PLLC

(57) ABSTRACT

A press includes an upper platen assembly having a first heating element, a lower platen assembly disposed beneath the upper platen assembly, the lower platen assembly having a second heating element, and a support head adapted to move the upper platen assembly between an open position and a closed position with respect to the lower platen assembly. The press further includes at least one heater controller operatively coupled to the first heating element and to the second heating element, and configured to separately apply power to the first heating element and to the second heating element.

20 Claims, 19 Drawing Sheets

(56) References Cited

U.S. PATENT DOCUMENTS

| | | | | |
|---|---|---|---|---|
| 5,252,171 | A | | 10/1993 | Anderson et al. |
| 5,408,938 | A | | 4/1995 | Genest |
| 5,472,549 | A | | 12/1995 | Jurrius et al. |
| 5,578,159 | A | * | 11/1996 | Miyashita ............. B29C 43/203 100/319 |
| 5,635,014 | A | | 6/1997 | Taylor |
| 6,058,834 | A | | 5/2000 | Beckwith |
| 6,983,690 | B2 | | 1/2006 | Eppinger |
| 7,185,584 | B1 | | 3/2007 | Woods et al. |
| 7,196,290 | B2 | | 3/2007 | Oliver et al. |
| 9,038,690 | B1 | | 5/2015 | Hsiao et al. |
| 9,573,332 | B2 | | 2/2017 | Robinson et al. |
| 2003/0160851 | A1 | | 8/2003 | Baccay et al. |
| 2005/0278984 | A1 | | 12/2005 | Kenney |
| 2006/0017942 | A1 | | 1/2006 | Clark |
| 2007/0084547 | A1 | | 4/2007 | Lane |
| 2007/0199491 | A1 | | 8/2007 | Riezu Bravo |
| 2008/0196836 | A1 | | 8/2008 | Woods |
| 2008/0227354 | A1 | | 9/2008 | Yoshida et al. |
| 2011/0076079 | A1 | | 3/2011 | Robinson |
| 2013/0233493 | A1 | | 9/2013 | Robinson et al. |

* cited by examiner

THREADABLE HEAT TRANSFER PRESS WITH HEATED LOWER PLATEN

CROSS-REFERENCE TO RELATED APPLICATION

This application is a continuation-in-part application of U.S. patent application Ser. No. 15/720,108, filed Sep. 29, 2017, which is a continuation-in-part application of U.S. patent application Ser. No. 15/419,742, filed Jan. 30, 2017, which is a continuation application of U.S. patent application Ser. No. 13/787,157, filed Mar. 6, 2013, and issued as U.S. Pat. No. 9,573,332 on Feb. 21, 2017, which claims priority to U.S. Provisional Patent Application Ser. No. 61/607,169, filed on Mar. 6, 2012, and to U.S. Provisional Patent Application Ser. No. 61/654,486, filed on Jun. 1, 2012, the contents of each of which are hereby expressly incorporated by reference in their entireties.

TECHNICAL FIELD

The exemplary illustrations described herein are generally directed to presses, such as heat transfer presses that include platens.

BACKGROUND

Heat applied transfers include a variety of indicia with inks, material layers, and adhesives that become bonded to material layers, for example, apparel such as shirts, jackets, or the like, upon pressurized contact and heating of the transfers and apparel between press platens. Graphic images and lettering may generally be accurately and quickly transferred to the apparel without bleeding or partial interruptions in the bonding of the transfer, as long as the presses can be operated at a predetermined temperature for a predetermined time and at a predetermined pressure.

The presses must be able to accommodate many variations in the arrangement of transfers and apparel, as well as the types of transfers and apparel materials available. Moreover, the presses accommodate a wide variety of temperatures, pressures, and time intervals associated with application of indicia to a garment. Due to the desire for flexibility and economic factors, presses have traditionally been manually operated, i.e., they often rely on a user (e.g., an operator) to control at least (a) the force applied through the platens and (b) the length of time the force is applied with a mechanical apparatus.

The accuracy and precision of the temperature, and the pressure and the time duration for which these parameters are applied to the transfers, are particularly important to complete an efficient bonding of the transfers to materials, and can be difficult to accomplish in an accurate and repeatable manner. In particular, and depending upon materials and the structure of the indicia to be applied to the apparel, indicia may be subject to inconsistent application conditions throughout the surface of apparel to which the transfer is applied. For example, the application of excessive pressure between the platen pressing surfaces may cause bleeding of the colors, while insufficient pressure may result in blotched or unattached areas where the indicia failed to adhere completely to the garment.

However, for some fabric types, such as lightweight polyester, tri-blend soft fabrics, and active sports fabrics, the materials are susceptible to searing, marking, fabric buckling, melting, scorching, puckering, wrinkling, and formation of 'heat press boxes' when the requisite heat is applied in the bonding process. Excess temperature is often a factor in all these issues. In addition to high temperature issues, marking commonly occurs around the edges of the platen and near buttons, zippers, and seams. Not only frustrating, an end product may also be unsellable and is therefore wasted product. One known solution to reduce or eliminate such effects includes pre-heating the fabric and other materials, but pre-heating adds time and cost and in one example even doubles the overall print time.

Accordingly, there is a need to improve the bonding process in heat presses, for materials that are susceptible to damage that can occur during high temperature operations.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the disclosed subject matter described herein is not intended to be exhaustive or otherwise limiting or restricting to the precise form and configuration shown in the drawings and disclosed in the following detailed description. Examples of the present disclosed subject matter are described in detail by referring to the drawings as follows.

DETAILED DESCRIPTION

Figure 1A:
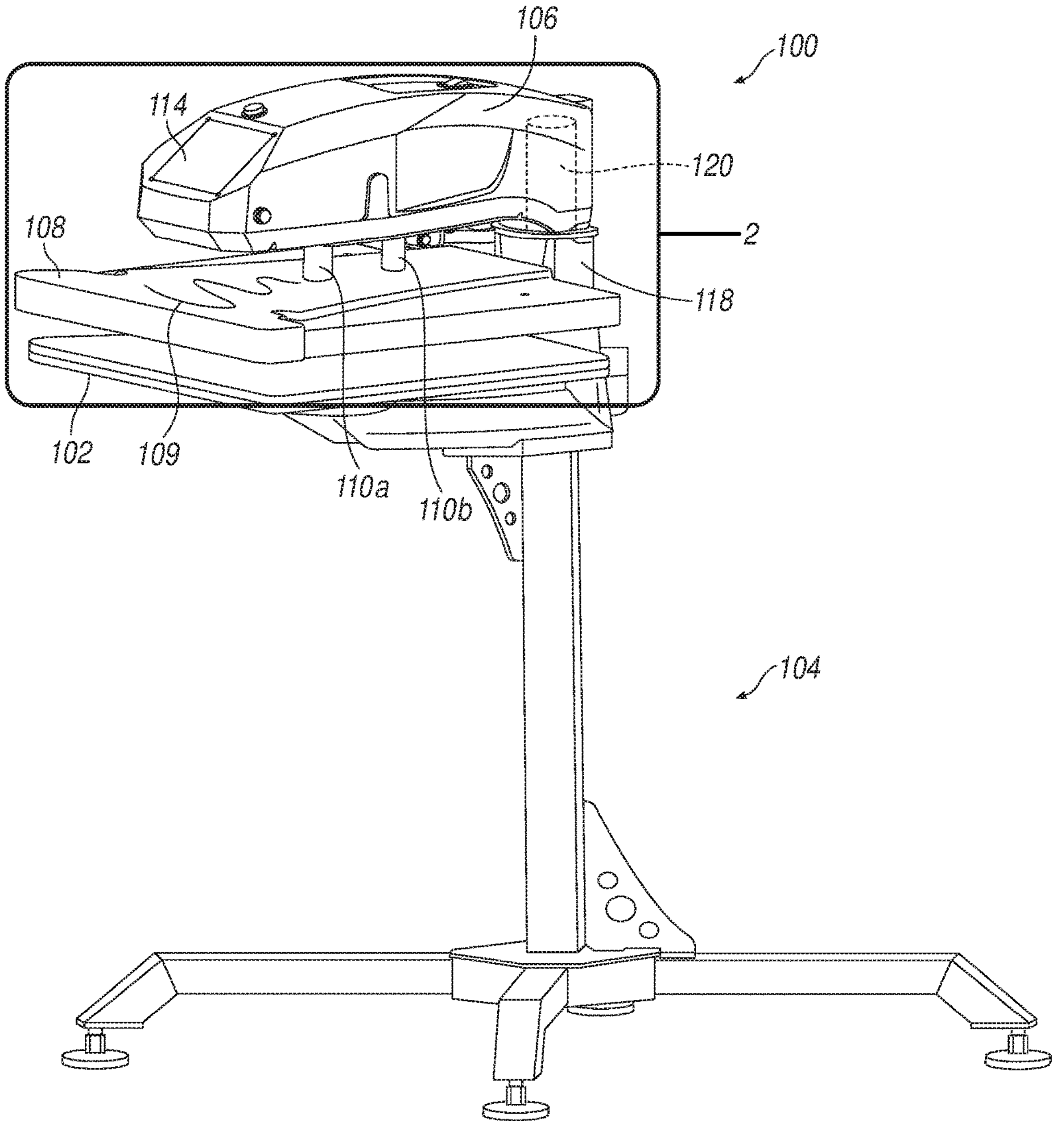
FIG. 1A is a lateral perspective view of an exemplary press.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Various exemplary illustrations are provided herein of exemplary presses, e.g., for applying indicia to garments by application of heat. According to one exemplary illustration, a press may include an upper platen, and a lower platen disposed below and generally aligned with the upper platen. The press may further include a support head adapted to move the upper platen between an open position, wherein the upper and lower platens are spaced away from one another, and a closed position, wherein the upper platen is pressed against the lower platen. The exemplary presses may further include a stand positioned on a ground surface or a table surface, and defining a throat spacing beneath the lower platen, the stand being spaced horizontally away from a geometric center of the lower platen. In some examples, the stand is adjustable between a plurality of heights.

Figure 1B:
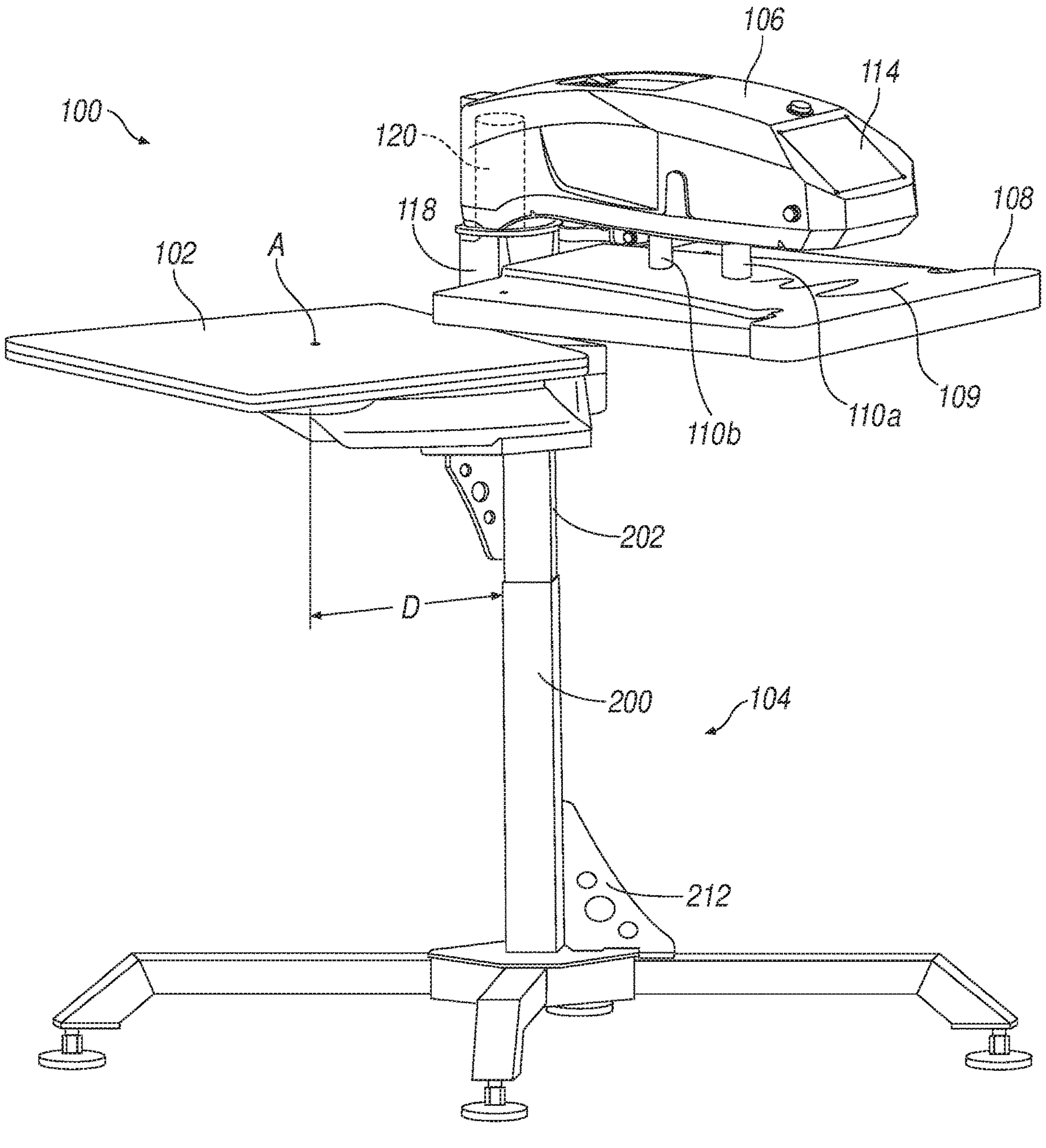
FIG. 1B is a lateral perspective view of the press shown in FIG. 1A, with the support head rotated away from the lower platen.
Figure 2:
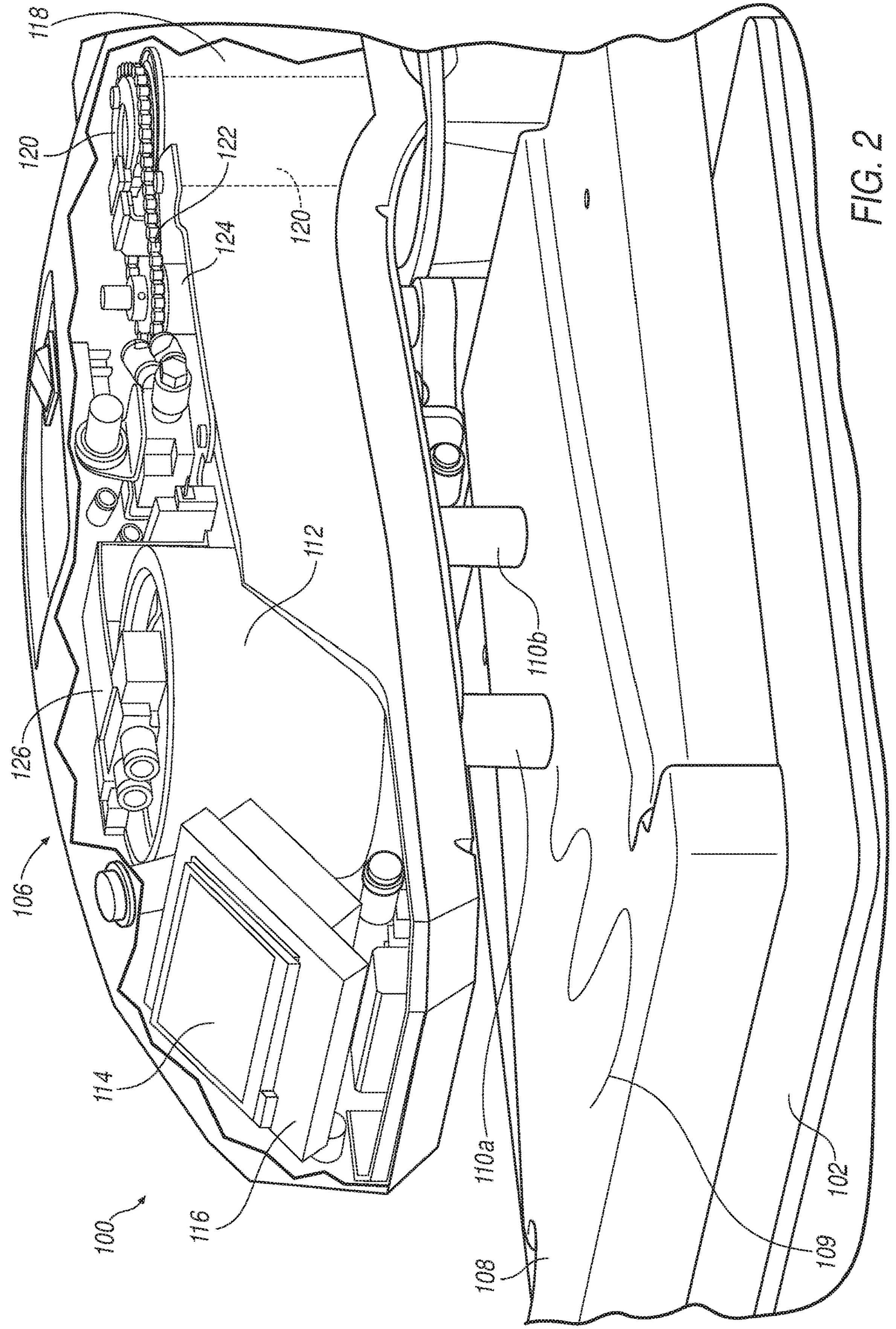
FIG. 2 is a partial cutaway perspective view of the support head of the press shown in FIGS. 1A and 1B.

Referring now to FIGS. 1A, 1B, and 2, an exemplary heat applied transfer press 100 is shown. The press 100 includes a lower platen 102 mounted on a stand 104 or base frame, and a support head 106 supporting an upper platen 108 above the lower platen 102. Force may be applied to upper platen 108 through a pair of shafts 110*a*, 110*b*. The mechanism for displacing the upper platen 108 to impart a force to the lower platen 102 may include a pneumatic pressure chamber 112. In one example, the platens 102, 108 may include a work structure of a machine tool and a generally flat plate of a press configured to press a material, e.g., a garment, to allow placement of indicia on the garment.

The support head 106 may position the upper platen 108 in a substantially parallel alignment with the lower platen 102 as it approaches a closed position, e.g., as best seen in FIG. 1A. Moreover, the closed position of the upper platen 108 can be varied, e.g., to raise the level of upper platen 108 with respect to the lower platen 102. As a result, regardless of the thickness of the material, the transfers to be applied, or the thickness of the support pads to be used between the upper and lower platens 108, 102, the alignment of the upper and lower platens 108, 102 avoids uneven pinching of the material and the transfers positioned between upper and lower platens 108, 102. Pads (not shown) may also assist the pressure distribution regardless of irregularities in the thicknesses of the heat applied transfers and the apparel to which it is applied.

At least one of the platens, e.g., the upper platen 108, includes a heating element 109 such as conventional electrically resistive heating elements and the like, which may be formed as serpentine or otherwise wound throughout the surface area of the upper platen 108. The heating element is coupled to a typical power supply through a switch and/or a controller, and may be configured for adjusting the temperature of the heating element, e.g., by way of the controller. Further, the temperature of the heating element may be adjusted at a visual display 114 which interfaces with a controller 116, as best seen in FIG. 2. The upper platen 108 may also carry a thermo-couple sensor (not shown) which is wired in a conventional manner to generate temperature information for the controller 116, which may display such information via the display 114. The display 114 may thus be mounted for exposure to an area occupied by a press operator as typically positioned for manipulating and controlling the press 100, e.g., as best seen in FIG. 1A. The electrical circuit for the heating element may also include a temperature control such as a thermostat.

In addition, lower platen 102 includes a heating element and a separate controller (as further discussed with respect to FIGS. 15-17 below) for applying heat to lower platen 102, according to the disclosure.

The controller 116 may generally include computational and control elements (e.g., a microprocessor or a microcontroller). The controller 116 may generally provide time monitoring, temperature monitoring, pressure monitoring, and control, as examples. The display 114 may further include various readout displays, e.g., to allow display of a force, temperature, or time associated with operation of the press. Moreover, the display 114 may allow for manipulation of the controller by a user, e.g., by way of a touchscreen interface. The display 114 may thereby be used by the operator to adjust an amount of force applied by the upper platen 108 to the lower platen 102, a cycle time for the force to be applied, and a temperature of the heated platen(s), as examples. Controller 116 may operate press 100 in an automated mode to include pressure, temperature, power, and time settings, as examples, for a given application. According to the disclosure, data is heuristically obtained for, for instance, a given apparel and transfer design. Best practices are employed based on experience obtained in some locations or with one transfer press, as examples, and applied to other transfer presses, apparel designs, transfers, and at other locations. Statistical data is accumulated in, for instance, a database, and best practices from the heuristic data are accumulated, analyzed, and optimized in order that settings may be collectively improved based on what is learned from other applications, locations, etc. Respective settings may be selected via use of display 114. Such data may thereby be accessible via a network by users at different locations from where any data is gathered.

The controller 116 may facilitate a variety of user-customized settings for use of the press. In one exemplary illustration, the controller 116 includes a memory for storing one or more programs associated with application of an indicia to a garment, including a predetermined temperature, a predetermined force, and/or a predetermined cycle time associated with the upper platen 108. In another exemplary illustration, the programs may include a plurality of stages in the application process, e.g., where the upper platen 108 is applied to a garment with a first pressure that is applied to a garment for a first cycle time, and a second pressure that is subsequently applied for a second cycle time. In some examples, the pressure and cycle time are different, such that a variety of different pressures and cycle times may be applied by the transfer press 100.

As noted above, the support head 106 generally supports and aligns the upper platen 108 with respect to the lower platen 102. The support head 106 may also be pivotable about an axial support 118, as best seen in FIG. 2, away from the lower platen 102, to allow placement of a garment upon the lower platen 102. More specifically, the support head 106 may generally pivot about a pivot shaft 120 disposed within the axial support 118. The support head 106 may include a drive chain 122 or belt which is rotated by a motor 124 disposed within the support head 106, thereby rotating the support head 106 about the pivot shaft 120. The motor 124 may be controlled by way of the controller 116.

As briefly described above, a pressure chamber 112 may be employed to selectively move the upper platen 108 with respect to the lower platen 102, thereby selectively imparting a force against the lower platen 102. The pressure chamber 112 may be controlled by any pressure regulating device that is convenient. In one example, and as best seen in FIG. 2, an electric pressure (EP) Regulator 126 in communication with the controller 116 and the pressure chamber 112 may facilitate movement of the shaft(s) 110*a*, 110*b* of the upper platen 108. In one exemplary illustration, the EP regulator 126 is an SMC ITV 1050 regulator.

The various components that facilitate automated operation of the transfer press 100 may generally be integrated into the support head 106. For example, as described above the support head 106 may include therein the display 114, controller 116, pressure chamber 112, motor 124, and drive belt 122. Accordingly, the support head 106 may generally house the main components of the press 100 that provide automated operation of the transfer press 100.

In one exemplary illustration, the controller 116 is a Freescale i/MX processor. The processing power available in this exemplary ARM920 based architecture of the i/MX may generally communicate with the display 114, e.g., a color LCD touchscreen. Accordingly, the controller 116 may generally control heating, setting and monitoring of the application pressure, monitoring system health, interpreting touchscreen inputs, and optimizing system operation, all while supervising numerous other system operations simultaneously.

Controller 116 may include a memory, having the ability to store a large number of application programs. In one example, over 1000 application programs or "recipes" may be stored, each with individual control of, for example, four (4) sub-steps, each with varying pressure and dwell or cycle times. Accordingly, setup time is reduced and consistency is improved, since it effectively eliminates human error. More specifically, by automatically setting and monitoring the pressure during each step, e.g., as supplied by the pressure chamber 112, the operator generally does not have to worry about varying fluctuations in a power supply to the support head 106. Moreover, the pressure chamber 112 also removes one source of potential error as a result of any inconsistent pressure supplied by the operator. In one exemplary illustration, an air compressor (not shown in FIGS. 1A, 1B, and 2) may be used to supply compressed air to the pressure chamber 112, which is used to manipulate the upper platen 108 downward against the lower platen 102, e.g., to apply heat to a garment/indicia assembly. The controller 116 may automatically compensate for any changes or inconsistencies in the air supply to the pressure chamber 112, and it may also alert the operator of any problems, e.g., insufficient, or total loss of supplied air pressure. Operator fatigue is also significantly reduced by eliminating the stress of constantly adjusting the press to provide the proper pressure, e.g., via pressure valves or levers, since the only inputs to the press 100 are generally via the touchscreen display 114.

As noted above, the controller 116 may be configured to pivot the support head 106 about the axial support 118. Accordingly, the operation of the transfer press 100 may be integrated with the pivoting of the support head 106 before and/or after the upper platen 108 is forced against the lower platen 102. The ability to apply the upper platen 108 for a predetermined pressure and time may thus be combined with the ability to retract and swing the support head 106 out of the way in a synchronous fashion. The time saved in each print may only be seconds, but in a continuous operation these seconds quickly multiply into saved hours associated with a given job. Moreover, operator fatigue is further reduced by eliminating the need to manipulate the press manually.

The controller 116 may also include a standardized interface (not shown) to allow for system upgrades in the field, e.g., a USB interface. The controller 116 may also allow for multiple levels of user access, e.g., to allow setting limits on a maximum pressure or temperature to be provided by the platen(s). Also, the controller 116 may be supplied power via a universal A/C input range of 100-240 VAC at 50/60 Hz.

Figure 3:
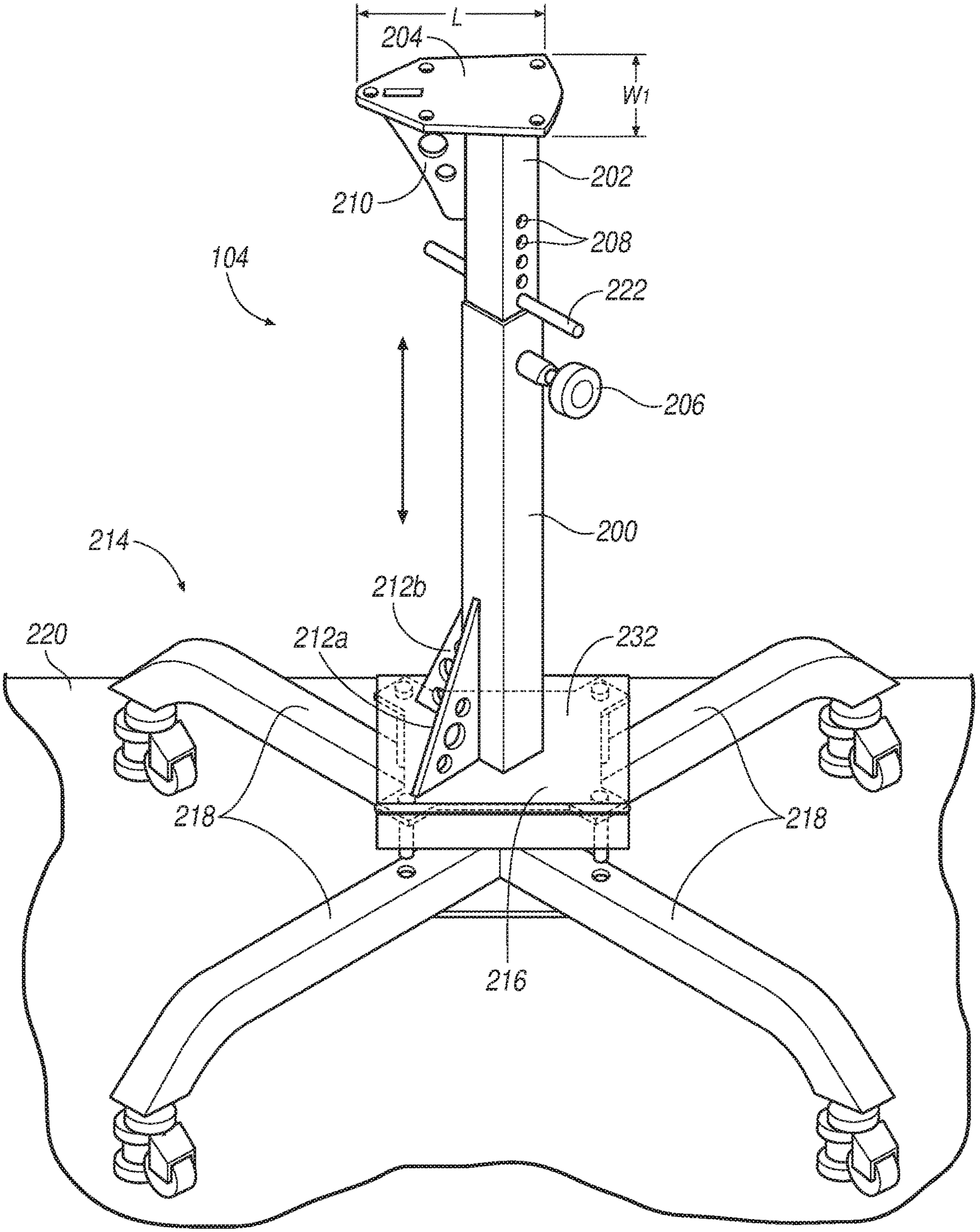
FIG. 3 is a perspective view of an exemplary stand for a press.

As noted above, an exemplary press 100 may be mounted on a stand 104. Turning now to FIG. 3, an exemplary stand 104 is illustrated in further detail. A stand 104 may be adjustable by way of a telescoping receiver tube 200. For example, the receiver tube 200 may generally receive an insert tube 202 which is attached to a support of the press 100, which as illustrated may be a swinger-type press as described in detail above.

Moreover, the support may include a horizontal support plate 204 which extends generally horizontally beneath the press 100. The horizontal support plate 204 thereby provides a relatively wide support that allows the receiver tube 200 and insert tube 202 of the stand 104 to be spaced horizontally away from the lower platen 102. Moreover, an associated support of the lower platen 102 may be relatively narrow, thereby defining a "throat spacing" that is narrow enough to allow garments to be "threaded" over the lower platen 102 during operation. Accordingly, the shifted position of the lower platen 102 horizontally with respect to the stand 104, and in particular the insert tube 202 and receiver tube 200 which comprise the primary support member of the stand 104, in combination with a relatively narrow throat spacing, generally creates space around the lower platen 102 that allows garments to be threaded over the lower platen 102, as will be described further below.

As noted above, the stand 104 may be an adjustable, e.g., telescoping, stand that allows the transfer press 100 to be moved upwards and downwards. As the transfer press 100 may be relatively heavy, e.g., greater than 100 pounds, the stand 104 may include a resistance mechanism that generally allows for easier movement of the stand 104 up and down. For example, a tensioning mechanism such as a spring (not shown) may be provided in the receiver tube 200. More specifically, the spring may be provided that generally compresses or extends in response to downward movement of the insert tube 202, thereby decreasing a force needed to adjust the transfer press 100 upwards or downwards. Other types of tensioning mechanisms may be provided, e.g., a gas shock, or other compliant member, merely as examples. A threaded knob 206 may allow fixation of the insert tube 202 relative to the receiver tube 200 to define a desired height of the press 100, e.g., by engaging corresponding adjustment apertures 208 defined by the insert tube 202, or by engaging the insert tube 202 directly. In one example, the transfer press 100 may be adjusted upwards and downwards between a lower position where the lower platen 102 is, in one example, approximately 37 inches above ground level, and an upper position in which the lower platen 102 is, in this example, approximately 44 inches above ground level. This exemplary range of adjustment may allow positioning of the lower platen 102 approximately at the beltline of nearly all adults, e.g., as may be required for operating the press 100. In another exemplary illustration, the adjustment spans a range of approximately 18 inches. Moreover, the assist spring force may be varied to match the particular press employed. In one example, the spring provides a maximum spring/assist force of approximately 100 pounds, corresponding to slightly less than an overall weight of the press 100 supported by the stand 104.

The stand 104 may have a generally vertical orientation, i.e., where the receiver tube 200 and insert tube 202 are each generally vertical. Such a vertical orientation may facilitate adjustment of the stand 104 upwards and downwards by reducing friction between the insert tube 202 and receiver tube 200. By contrast, some examples of previously known stands employ an angled stand construction, which typically is provided to increase stability of the press as mounted to the stand. To increase stability of the stand 104 shown when a press 100 is mounted in a "cantilever" manner, i.e., as described herein with the insert tube 202 and/or receiver tube 200 spaced horizontally away from a geographic center of the platen(s) 102, 108, a vertical support plate 210 may be provided.

Moreover, additional vertically oriented supports 212 may be provided at a lower portion of the stand 104, e.g., extending generally vertically between the receiver tube 200 and a component of a base portion 214 of the stand 104, e.g., a hinge plate 216 or legs 218. For example, additional vertically extending supports 212 are provided that are each secured to the receiver tube 200 along a vertical edge of the supports 212. The supports 212 may in turn be secured along a bottom edge thereof to one of the support legs 218, or to hinge plate 216. The vertical support plate 210 and the vertically extending supports 212 may be generally positioned to counteract a moment applied to the stand 104 by the press 100 when the press 100 is mounted to the stand 104.

The support legs 218 may also extend a predetermined distance in a horizontal direction away from the receiver tube 200. More specifically, the support legs may extend a sufficient distance away to, at a minimum, counteract any moment applied by the transfer press 100 to the stand 104 when the transfer press 100 is mounted to the stand 104 and/or during use of the transfer press 100. Additionally, the support legs 218 may be independently adjustable for length, thereby allowing adjustment of the stand 104 for any desired type of press that may be secured to the stand 104.

Exemplary press stands may be employed with any type of press that is convenient. For example, as described above and illustrated in FIGS. 1-3, a swinger-type press may be used where the upper platen 108 generally rotates or "swings" horizontally with respect to the lower platen 102. In another exemplary illustration, a clam-type press (not shown) may be used where the upper platen 108 rotates or swings vertically away from the lower platen 102. Moreover, to allow installation of multiple presses or press types to an exemplary stand, a standardized or universal attachment configuration may be employed, e.g., a standardized bolt pattern for securing the horizontal support plate 204 to a bottom support of the press, i.e., horizontal support 201.

As noted above, the "open throat" design provided by the vertical spacing of the stand 104 with respect to the lower platen 102, the elevation of the lower platen 102 from an associated ground surface 220 or tabletop surfaces (not shown), and the relatively narrow horizontal support plate 204 supporting the lower platen 102 generally allows garments to be "threaded" over the lower platen 102. For example, a shirt may be threaded over the lower platen 102 due to the horizontal or lateral offset between the stand 104, and particularly the receiver tube 200 and/or insert tube 202, from a geometric center A of the lower platen 102, the spacing of the lower platen 102 from the ground 220 below defined by the stand 104, and the relatively narrow horizontal support 204 beneath the lower platen 102. Accordingly, a short garment (not shown in FIGS. 1A, 1B, and 3) may be "threaded" over the lower platen 102, i.e., by inserting the lower platen 102 into the bottom of the shirt, so that a portion of the shirt may be positioned on the lower platen 102 for applying an indicia or design. By contrast, a press sitting directly on a support surface, e.g., a tabletop, counter, or stand without such an offset, generally may not allow a garment to be threaded in the same manner due to the presence of the support surface below the transfer press 100. Moreover, as noted above this condition would also occur if a stand were provided that were not sufficiently offset with respect to the geometric center A of the lower platen 102.

Figure 4:
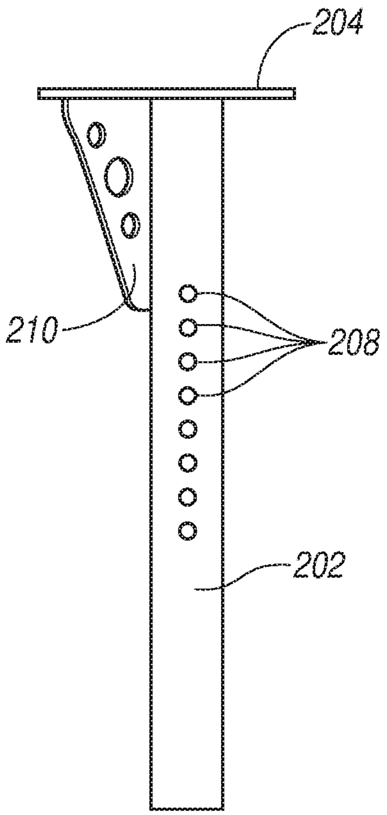
FIG. 4 is a side view of an exemplary insert tube for the stand of FIG. 3.

Turning now to FIGS. 3 and 4, and as generally noted above, the stand 104 may be adjustable vertically by way of a telescoping receiver tube 200 receiving an adjustable insert tube 202 therein. For example, the receiver tube 200 may generally receive an insert tube 202 which is attached to a horizontal support 204 configured to secure the press 100 thereto. Insert tube 202 may define a plurality of apertures 208 for selectively positioning the insert tube 202 with respect to the receiver tube 200, e.g., using an adjustable lock knob 206.

Moreover, the horizontal support plate 204 may extend generally horizontally beneath the transfer press 100. The horizontal support plate 204 may generally be designed to accept multiple universal mounting plates for various presses or other equipment, allowing the stand 104 to be configured for use with virtually any press. The horizontal support plate 204 generally provides a relatively wide support structure extending laterally beneath the lower platen 102, which allows the receiver tube 200 and insert tube 202 of the stand 104 to be spaced horizontally away from the lower platen 102. More specifically, as best seen in FIG. 1B the lateral spacing D between the geometric center A of the lower platen 102 and the receiver tube 200 and/or insert tube 202 generally prevents the stand 104 from interfering with threading of a garment, e.g., a shirt, over the lower platen 102. Moreover, the horizontal support 204 of the lower platen 102 may be relatively narrow, e.g., such that a maximum width W and a maximum length L of the horizontal support 204 are smaller than a width or length of the lower platen 102. Accordingly, a "throat spacing" is provided that is narrow enough to allow garments to be "threaded" over the lower platen 102 during operation. Accordingly, the shifted position of the lower platen 102 horizontally with respect to the components of the stand 104, in combination with a relatively narrow throat spacing, generally creates space around the lower platen 102 that allows garments to be threaded over the lower platen 102. The horizontal support plate 204 may generally be designed with the ability to permanently mount to a press, or to mount a press for easy removal, e.g., via quick release pins. Additionally, the support plate 204 and stand 104 may generally be portable, thereby allowing for easier transportation. For example, the stand 104 may be assembled with one or more quick-connect type fasteners which allow the stand to be folded or taken apart, e.g., for transportation.

As noted above, the stand 104 may be an adjustable, e.g., telescoping, stand that allows the press 100 to be moved upwards and downwards. Allowing for height adjustment, e.g., as described above in regard to FIGS. 1A, 1B, and 3, may facilitate proper ergonomic positioning for repetitive work. As the press 100 itself may be relatively heavy, e.g., greater than 100 pounds, the stand 104 may include a resistance mechanism that generally allows for easier movement of the stand up and down. For example, a tensioning mechanism such as a spring may be provided in the lower receiver tube. More specifically, a spring (not shown) may be provided that generally compresses or extends in response to downward movement of the insert tube, thereby decreasing a force needed to adjust the press upwards or downwards. Other types of tensioning mechanisms may be provided, e.g., a gas shock (not shown in FIGS. 1A, 1B, and 3), or other compliant member, merely as examples. To accommodate frequent changes in height, or components of varying weight, the stand 104 may, in some examples, include a motor and lead screw to raise & lower the stand. Alternatively or in addition, a threaded knob 206 as described above may allow fixation of the insert tube 202 relative to the receiver tube 200. The threaded knob 206 may be any cross sectional shape that is convenient, e.g., square, round or any other shape that is convenient. Moreover, the knob 206 may generally define a desired height of the equipment or press 100, e.g., by engaging corresponding adjustment apertures 208, or by engaging the insert tube 202 itself. Other types of retention mechanisms may be provided, e.g., a pin, spring loaded clip or other member, merely as examples. In addition, a secondary safety pin 222, may be added to the upper portion of the telescoping stand, e.g., in insert tube 202, to ensure that the insert tube 202 will generally not fall below a certain level.

Figure 5:
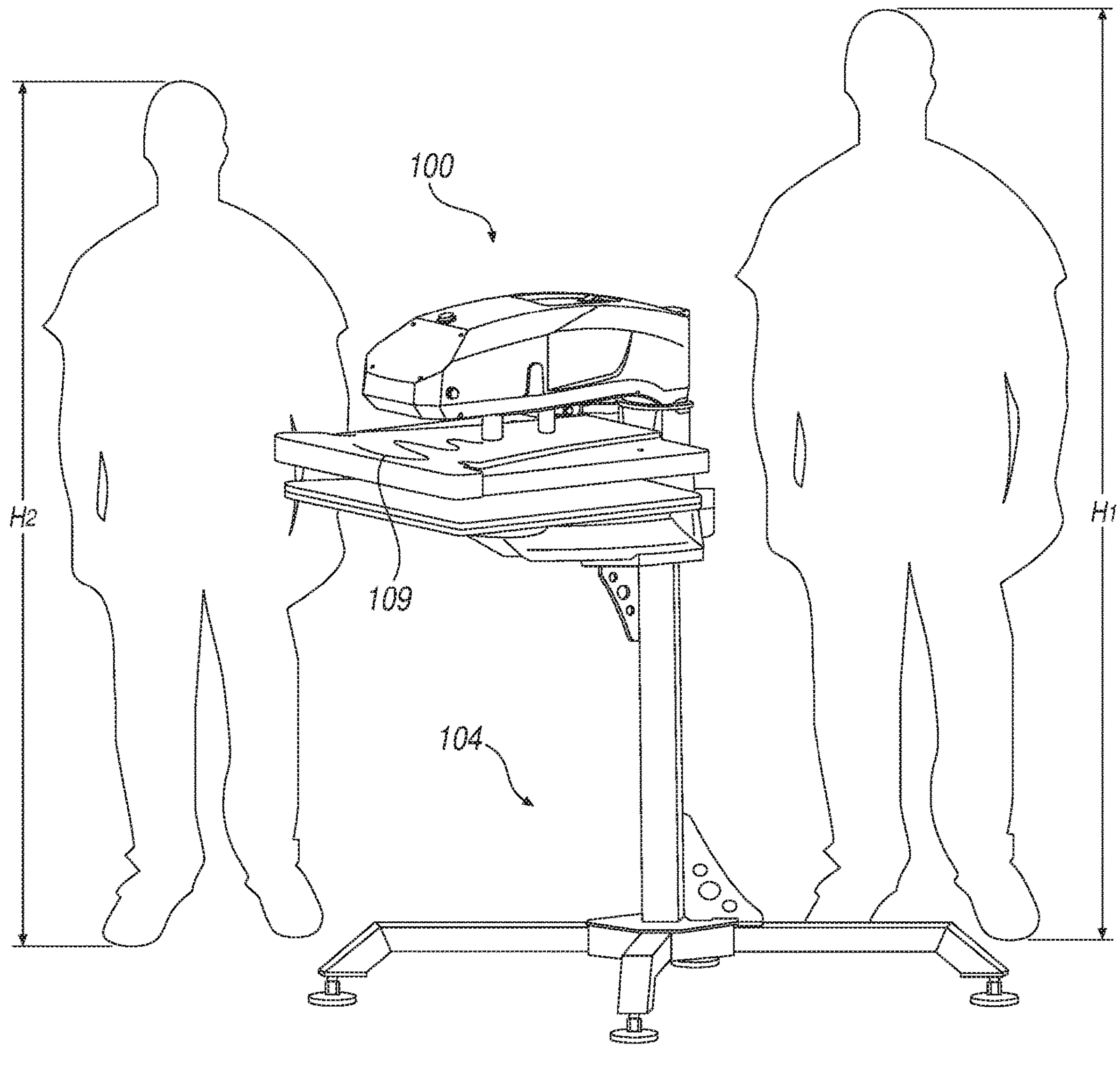
FIG. 5 illustrates a perspective view of an exemplary press illustrating a height adjustable stand facilitating use my operators of varying heights.

Accordingly, the press 100 may be positioned between lower and upper positions to fit different operators, e.g., defining varying heights H1, H2, as best seen in FIG. 5. In one exemplary illustration, the stand 104 may be adjusted upwards and downwards between a lower position, where the lower platen 102 of the press 100 is approximately 37 inches above ground level, and an upper position in which the lower platen 102 is approximately 44 inches above ground level. This exemplary range of adjustment may allow positioning of the lower platen 102 approximately at the beltline of nearly all adults, e.g., as may be required for operating the press 100 or equipment. These measurements may vary based on make and model of equipment or press being attached. In another exemplary illustration, the adjustment range of the stand 104 spans a range of approximately 18 inches. Moreover, the assist spring force may be varied to match the particular press 100 employed. In one example, the spring provides a maximum spring/assist force of approximately 100 pounds, corresponding to slightly less than an overall weight of the press 100 supported by the stand.

As shown in FIGS. 1A, 1B, and 3, the stand 104 may have a generally vertical orientation, i.e., where the receiver tube 202 and insert tube 200 are each generally vertical. Such a vertical orientation may facilitate adjustment of the stand 104 upwards and downwards by reducing friction between the insert tube 202 and receiver tube 200. By contrast, some examples of previously known stands employ an angled stand construction, which typically was provided to increase stability of the press as mounted to the stand. To increase stability of the stand 104 shown when a press 100 is mounted in a vertically oriented or "cantilever" manner, i.e., with the insert tube 202 and/or receiver tube 200 spaced horizontally away from a geographic center A of the platen (s) 102, the vertical support plate 210 may be provided. Moreover, additional vertically oriented supports 212 may be provided at a lower portion of the stand 104, e.g., extending generally vertically between the receiver tube 202 and the base structure of the stand 104, e.g., the support legs 218. As best seen in FIG. 3, a first support 212*a* is secured along its bottom edge to a first one of the support legs 218, while a second support 212*b* is secured along its bottom edge to a second one of the support legs 218. The vertical support plate 210 and the vertically extending supports 212*a*, 212*b* on the lower legs 218 may be positioned to counteract a moment applied to the stand 104 by the equipment and/or press 100 when mounted to the stand 104.

Figure 6:
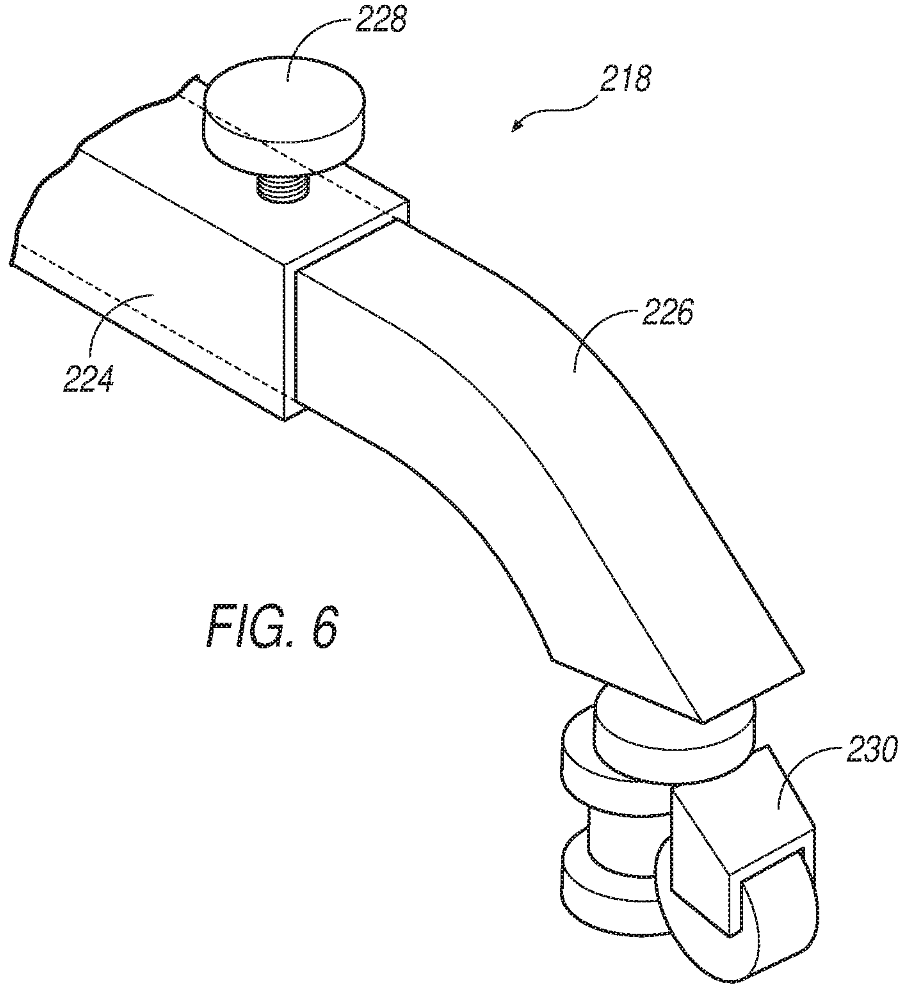
FIG. 6 illustrates a perspective view of an exemplary support leg of a stand.

The support legs 218 may also extend or telescope a predetermined distance in a horizontal direction away from the receiver tube 200. More specifically, as best seen in FIG. 6, one or more of the support legs 218 of the stand 104 have a support leg receiver tube 224, in which a support leg insert tube 226 is received to allow selective extension of the support leg insert tube 226. The support leg 218 may thereby be adjusted to extend a sufficient distance away from the receiver tube 200 and/or insert tube 202, thereby generally counteracting any moment applied by the equipment or press 100 to the stand 104 when mounted or in use. A lock knob 228 and fixed adjustable foot or caster 230 may also be provided.

Figure 7A:
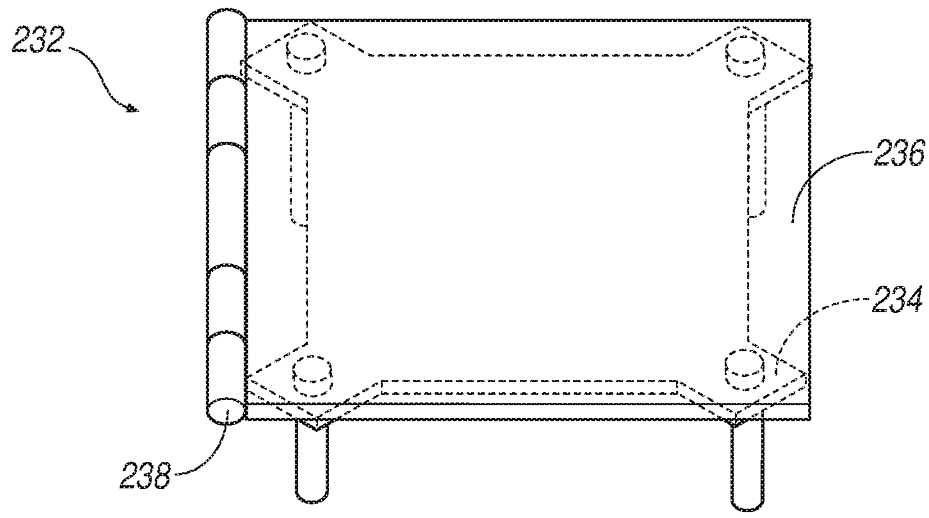
FIGS. 7A and 7B illustrate perspective views of a hinged support plate of a stand in an aligned position and in a pivoted position, respectively.
Figure 7B:
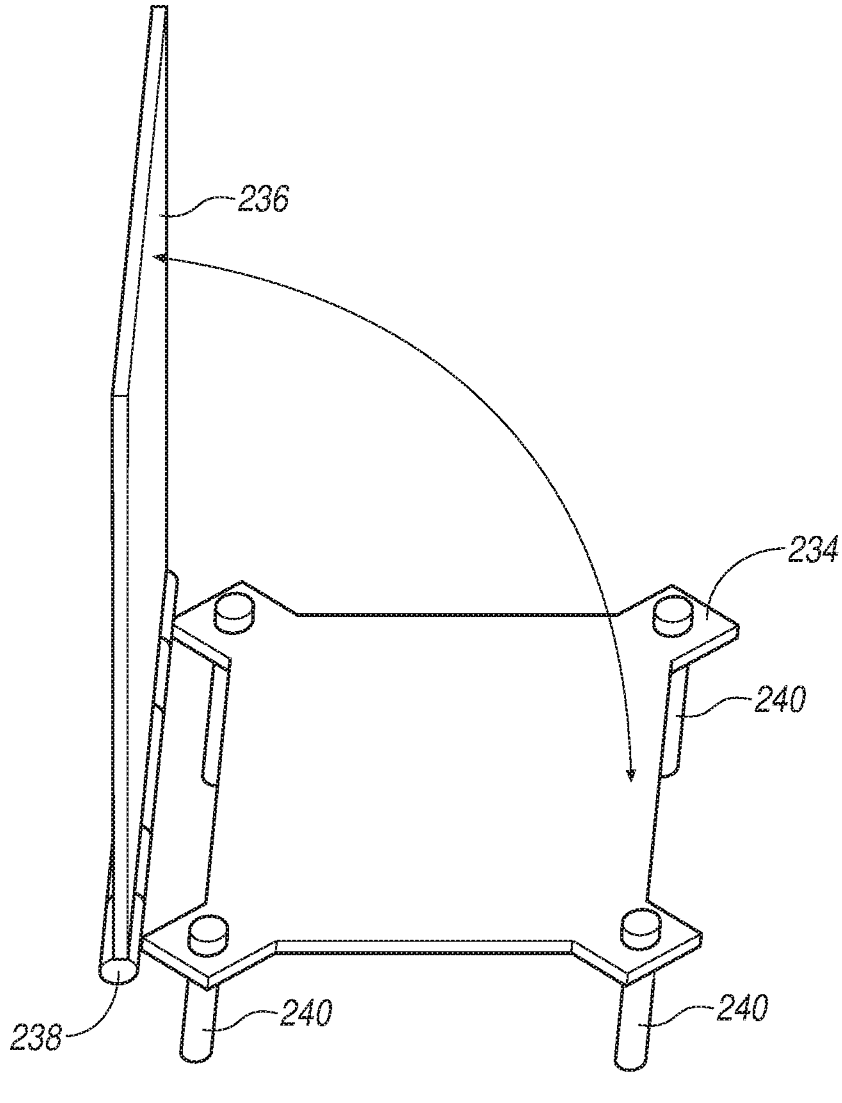

The stand 104 may also be collapsible to facilitate transportation. By contrast, some examples of previously known stands are fixed and too large to be transported easily. As shown in FIGS. 3, 7A, and 7B, the stand 104 may employ a hinged base 232 at the base of the receiver tube 200. The hinged base 232 may include a base plate 234 which is selectively secured to the support legs 218, e.g., via bolts 240. The hinged base 232 may further include a stand plate 236 which is hinged with respect to the base plate 234 via a hinge 238. The receiver tube 200 of the stand 104 may be secured to the stand plate 236, such that the receiver tube 200 pivots with the stand plate 236 with respect to the base plate 234. Accordingly, the receiver tube 200 and the entire support structure of the press 100 may generally be pivoted approximately ninety (90) degrees so the receiver tube 200 is approximately parallel with respect to the legs 218, thereby minimizing overall size and facilitating transport of the stand 104. Moreover, the receiver tube 200 itself may be selectively removable from the base portion of the stand 104, including the legs 218.

Figure 8:
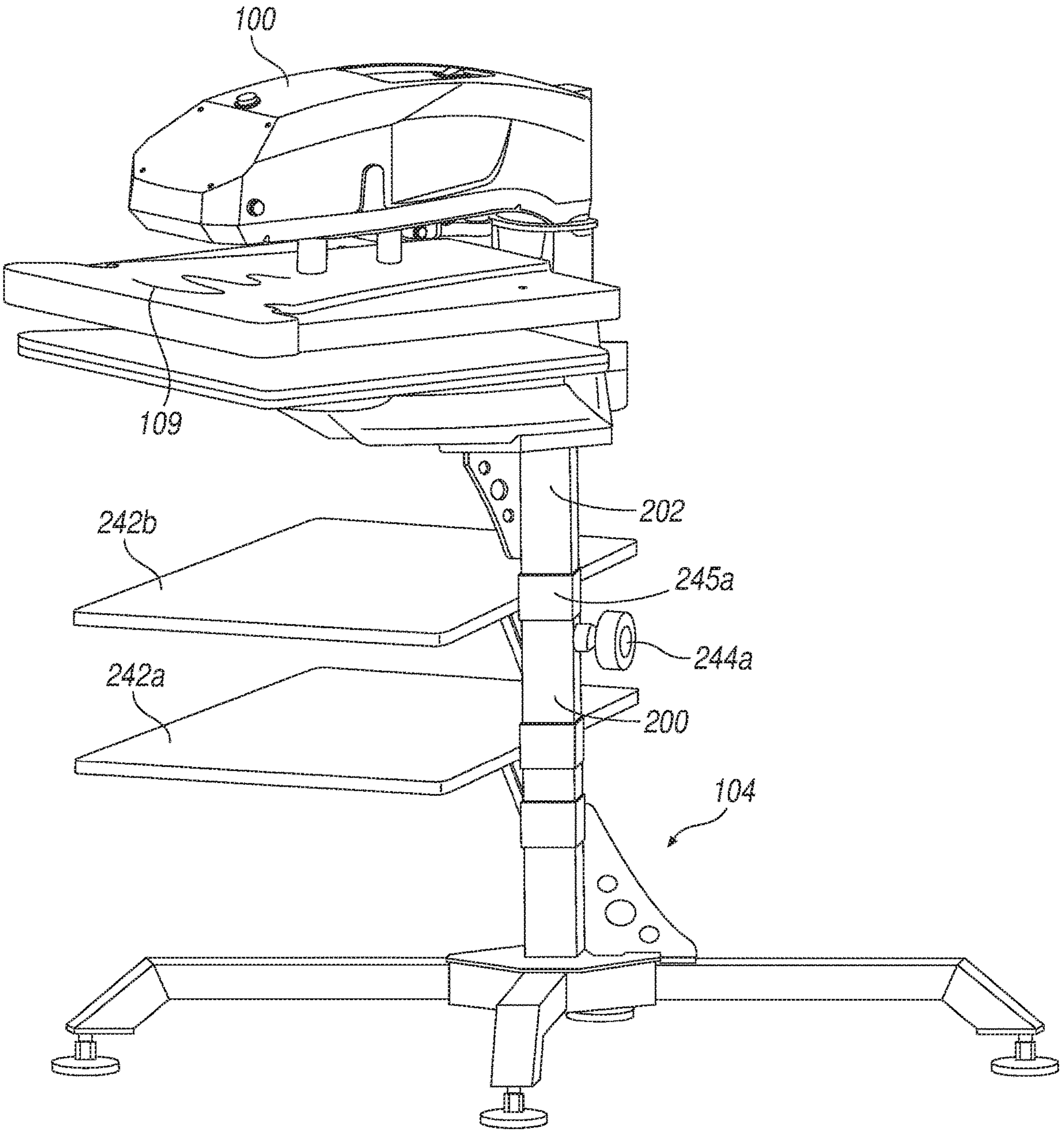
FIG. 8 illustrates a perspective view of an exemplary stand having a plurality of adjustable shelves.
Figure 9:
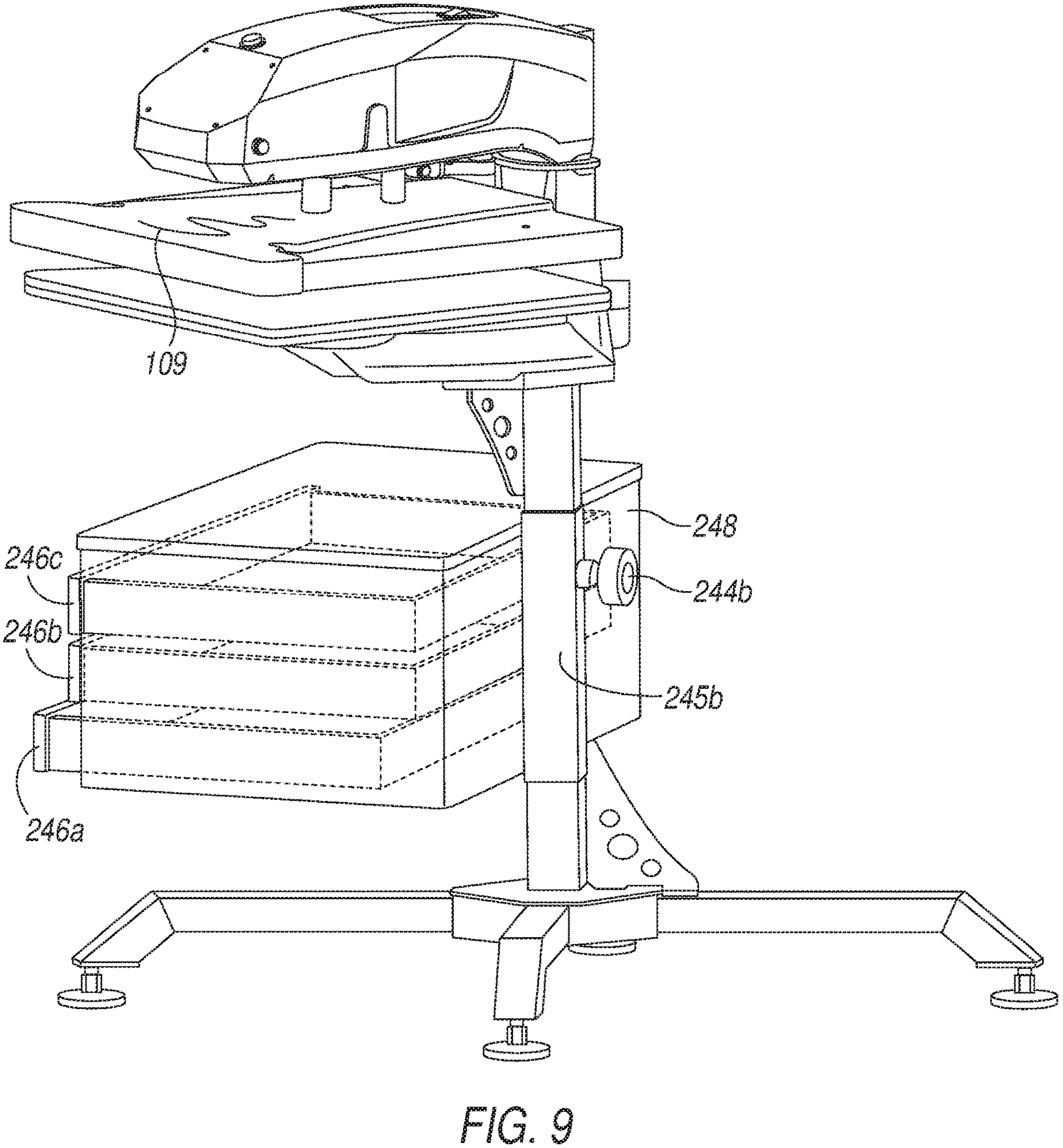
FIG. 9 illustrates a perspective view of an exemplary stand having a plurality of drawers.
Figure 10A:
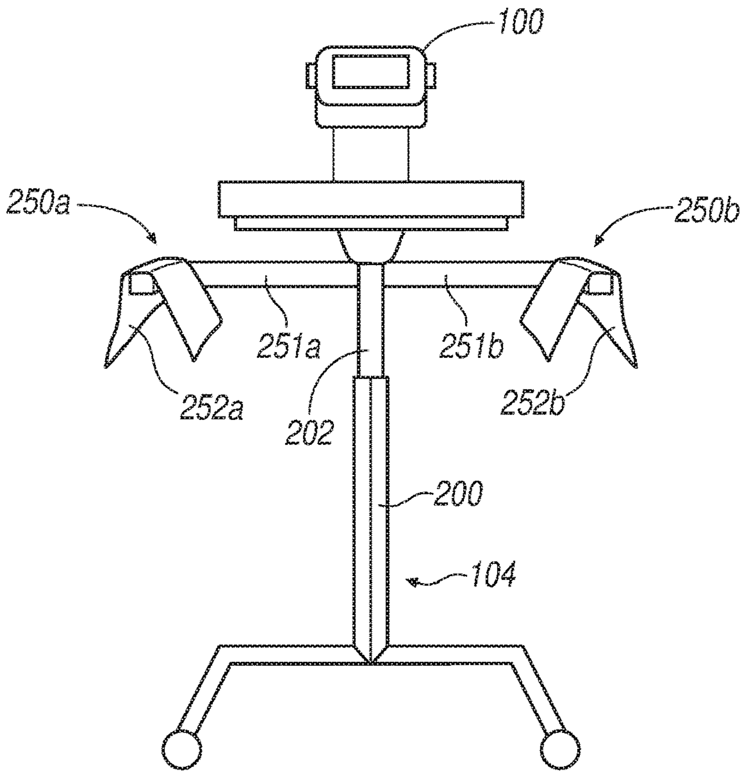
FIGS. 10A and 10B illustrate side and top views, respectively, of an exemplary stand having a plurality of garment placement arms.
Figure 10B:
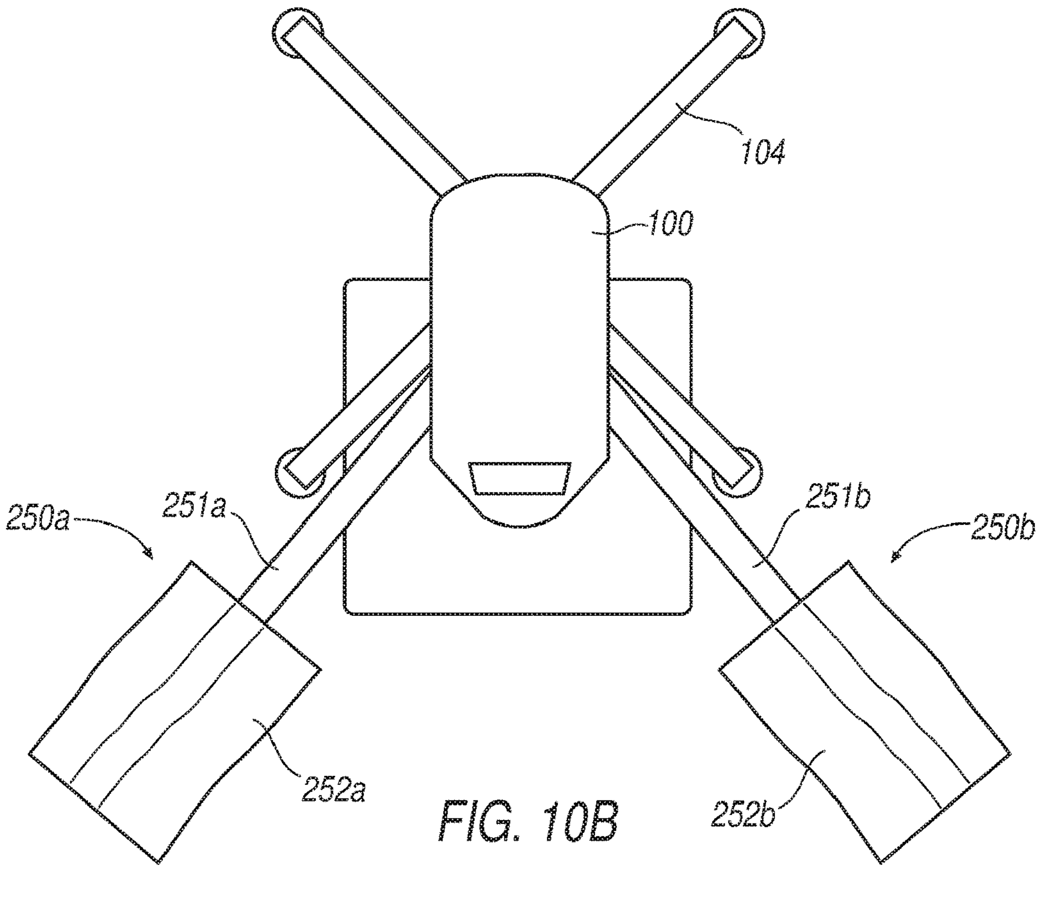

As shown in FIGS. 8-10, the stand 104 may have a variety of optional production accessories, each designed to increase efficiency of the operator and press 100 via improved ergonomics, and minimize operational motion. Attachments may be designed such that multiple accessories, or accessories of different types, may be installed on the same stand 104 simultaneously. By contrast, previous known stands support only a heat press itself, and therefore do not increase efficiency. These attachments may be fixed to the receiver tube 200 or insert tube 202, or to a universal attachment point (not shown) at the horizontal support plate 204. In one exemplary illustration, one or more shelves 242*a*, 242*b* may be attached to the receiver tube 200 or insert tube 202, thereby allowing a space for keeping cover sheet and/or transfers (not shown) for use with garments, as best seen in FIG. 8. The shelves 242 or a cabinet 248 may be adjustable in height with respect to the stand 104, e.g., by way of a lock knob 244*a*, 244*b*, that facilitates movement of a sliding sleeve 245*a*, 245*b* that fits around the receiver tube 200 or insert tube 202. In another example, a cabinet 248 having plurality of drawers 246*a*, 246*b*, 246*c*, as best seen in FIG. 9, is provided which provides for storage of heat press accessories. As yet another example, in FIGS. 10A and 10B a pair of garment stations 250*a*, 250*b* have been added that are secured to the stand 104, e.g., to the insert tube 202, to provide a place to hang garments, e.g., for staging before and/or after pressing. More specifically, the garment stations 250 may each include respective extension arms 251*a*, 251*b* which position garment placement surfaces 252*a*, 252*b* within generally easy reach of an operator during use of the press 100. Alternatively, hanging rods may be provided in addition to or in place of the garment stations 250 for garment storage.

Presses are typically operated in shops and manufacturing facilities globally, in which many thousands of operations are carried to apply transfers to apparel using pressure and heat for a given amount of time. However, there are widely varying conditions in which transfers are applied, not to mention a wide variety of types of transfers themselves. For instance, transfers may have different thicknesses, heat transfer characteristics, textures, and types of adhesives, to name a few. In addition, the apparel to which the transfer is attached can vary, as apparel can be cotton, polyester, or a mix of the two, as examples, and the apparel can also have different thickness from type to type, all of which can contribute to pressure, heat, and time settings that can vary from design to design.

And, conditions in which the presses are operated can vary widely, as well. For instance, some presses may be operated in hot tropical climates with little or no climate control for at least some conditions of operation—resulting in operation in a hot and humid environment. In other situations, presses may be operated in cold northern climates, in buildings that are heated—resulting in operation in a warm, low humidity environment. Operation in fact can take place in any sort of environmental condition, with the above being merely examples of conditions in which a press may be operated.

Thus, presses may be used under widely varying conditions, with different types of apparel, and with different types of transfers. Settings such as heat (or power to any heating elements), pressure, and time of application, as examples, can therefore vary widely depending at least on the above. As such, press settings are often determined via a trial-and-error approach, particularly if any "stock" or recommended settings from the manufacturer do not result in optimal adhesion of the transfer to the apparel.

That is, a manufacturer may include recommended settings for a given application, however due to the widely varying conditions described above, it may not be possible to account for all of such variations—leading a user to alter or have to "tweak" the stock or recommended press settings for specific applications. Users may therefore expend time, effort, and lost product in order to optimize press settings for any given application.

In addition, presses themselves may vary from location to location. For instance, some presses are automated or semi-automated, having press settings that are established for such type of operation. Other presses may be manually operated, and pressure applied may be established for manual operation in a manner that differs when compared to an automated press. Further, various releases of the same model press itself can result in a varied operation. That is, a press may be upgraded to a new model having, for instance, a different heating element or a different hydraulic pressure device, as examples. Or, a given model itself may be sold having upgraded control software with new settings, compared to a previous model.

Disclosed is an exemplary system that may include a network of presses that provide data usage for various types of presses, under various conditions of usage, and for varying types of applications. The disclosed system expedites a learning process to account for the above factors so that experience or best practices learned at one location, or for a given set of conditions, may be carried forth to another location or to another set of conditions, to account for the variances experienced. The disclosed system also provides feedback to a manufacturer so that new firmware may be written to improve process controls, or so that hardware may be upgraded based on usage in myriad different locations and conditions. The disclosed system also provides feedback so that setting upgrades may also be implemented, as well. Overall, the disclosed system and method heuristically employs best practices by accumulating statistical data and information related to pressure, time, and temperature, for a given apparel, indicia, or transfer, and applying that to other transfer presses, transfers themselves, and apparel to avoid what may otherwise be a long learning curve.

Figure 11:
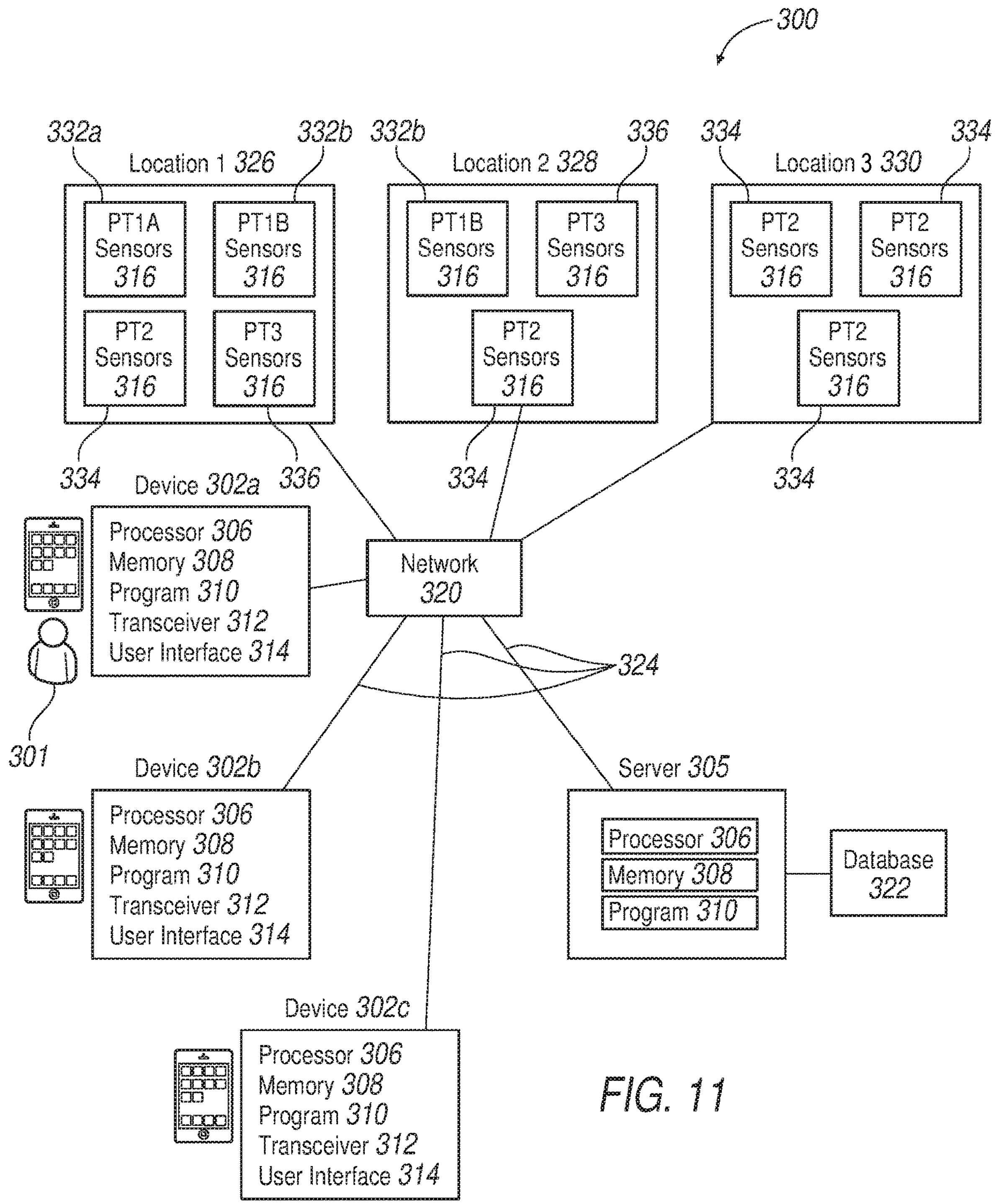
FIG. 11 illustrates an exemplary system including one or more presses.

FIG. 11 illustrates an exemplary system 300, for example, to generate and communicate press usage information based on usage at various locations, under different conditions, press types, and applications, using for instance a WIFI system. System 300 may take many different forms and include multiple and/or hardware components and facilities. While an exemplary system 300 is shown in FIG. 11, the exemplary components illustrated are not intended to be limiting, may be optional, and are not essential to any other component or portion of system 300. Indeed, additional or alternative components and/or implementations may be used.

System 300 may include or be configured to be utilized by a user 301 such as an engineer, statistician, or data processing technician. System 300 may include one or more of computing devices 302*a*, 302*b*, 302*c*, server 305, processor 306, memory 308, program 310, transceiver 312, user interface 314, sensors 316, network 320, database 322, and connections 324. Devices 302 may include any or all of device 302*a* (e.g., a desktop, laptop, or tablet computer), device 302*b* (e.g., a mobile or cellular phone), and device 302*c* (e.g., a mobile or cellular phone). Processor 306 may include a hardware processor that executes program 310 to provide any or all of the operations described herein (e.g., by device 302, server 305, database 322, or any combination thereof) and that are stored as instructions on memory 308 (e.g., of device 302, server 305, or any combination thereof).

An exemplary system 300 may include user interface 314, processor 306, and memory 308 having program 310 communicatively connected to processor 306. System 300 may further include transceiver 312 that may be communicatively connected to one or a plurality of sensors 316 associated with each of a plurality of presses 332*a*, 332*b*, 334, 336. For instance, system 300 may include a first location 326, a second location 328, and a third location 330 may, each of which may include one or more presses, press types, and/or press models. First location 326 may include a first press 332*a*, and a second press 332*b*. Both presses 332*a*, 332*b* may each be the same type of press (e.g., the same design), but representing different model releases (e.g., press 332*b* may be a subsequently released model having an improved heating element, as one example). First location 326 may also include a second press type 334 and a third press type 336.

Second location 328, representative of a different manufacturing facility than that of first location 326, may be either a different building within the same plot of land, a different state or country, or may be a different fabricator that uses the same or similar presses as used by a manufacturer at second location 328. Third location 330, similarly, may be representative of yet a different manufacturing facility, may be either a different building within the same plot of land, a different state or country, or may also be a different fabricator that uses the same or similar presses as used by other manufacturers.

System 300 using processor 306 may provide operations that include displaying by way of user interface 314 statistics related to usage of each of presses 332, 334, 336. That is, each of presses 332, 334, 336 may have input thereto, as will be further described, via sensors 316. Sensors 316 may generally be pressure sensors, temperature sensors, timing circuits, and the like, which may provide information about a given event (such as a shirt fabrication process in which a transfer may be applied to a piece of apparel). System 300 may also provide software, firmware, and sensor or other setting updates to any of presses 332, 334, 336 at any of first, second, and third locations 326, 328, 330 via network 320 and transceiver 312. That is, user 301 may update press settings having operational instructions for a press, firmware, sensor settings, time, temperature, pressure, and the like, in device 302*a*, device 302*b*, and/or device 302*c*.

System 300 may include an overall network infrastructure through which any of devices 302, server 305, and database 322 may communicate, for example, to transfer information between any portion of system 300 using connections 324. In general, a network (e.g., system 300 or network 320) may be a collection of computing devices and other hardware to provide connections and carry communications. Devices 302 may include any computing device such as a mobile device, cellular phone, smartphone, smartwatch, activity tracker, tablet computer, next generation portable device, handheld computer, notebook, laptop, projector device, or virtual reality or augmented reality device. Devices 302 may include processor 306 that executes program 310. Devices 302 may include memory 308 that stores press model, setting, and other information, and program 310. Devices 302 may include transceiver 312 that communicates information between any of devices 302, sensors 316, server 305, and database 322.

Server 305 may include any computing system. Server 305 may generate by processor 306, program 310 and store information by memory 308, e.g., information particular to each of presses 332, 334, 336. Server 305 may communicatively connect with and transfer information with respect to devices 302, sensors 316, and database 322. Server 305 may be in continuous or periodic communication with devices 302, sensors 316, and database 322. Server 305 may include a local, remote, or cloud-based server or a combination thereof and may be in communication with and provide information (e.g., as part of memory 308 or database 322) to any or a combination of devices 302. Server 305 may further provide a web-based user interface (e.g., an internet portal) to be displayed by user interface 314. Server 305 may communicate the information with devices 302 using a notification including, for example automated phone call, short message service (SMS) or text message, e-mail, http link, web-based portal, or any other type of electronic communication. In addition, server 305 may be configured to store information as part of memory 308 or database 322. Server 305 may include a single or a plurality of centrally or geographically distributed servers 305. Server 305 may be configured to store and coordinate information with and between any of devices 302, and database 322. System 300, or any portion of system 300 such as devices presses 332, 334, 336, may include one or more sensors 316 configured to receive sensor inputs and provide sensor outputs, e.g., including press usage information associated with temperatures and pressures.

User interface 314 of devices 302 may include any user interface device, display device, or other hardware mechanism that connects to a display or supports user interfaces so as to communicate and present press information throughout the system 300. User interface 314 may include any input or output device to facilitate receipt or presentation of information (press operation information) in audio or visual form, or a combination thereof. Examples of a display may include, without limitation, a touchscreen, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, projector device, and the like. User interface 314 may present information to any user 301 of devices 302.

Connections 324 may be any wired or wireless connections between two or more endpoints (e.g., devices or systems), for example, to facilitate transfer of press information, to facilitate upgradeable enhancements to presses, such as wirelessly or via wired connections. Connection 324 may include a local area network, for example, to communicatively connect the devices 302 with network 320. Connection 324 may include a wide area network connection, for example, to communicatively connect server 305 with network 320. Connection 324 may include a wireless connection, e.g., radiofrequency (RF), near field communication (NFC), Bluetooth communication, WIFI, or a wired connection, for example, to communicatively connect the devices 302, and sensors 316.

Presses 332, 334, 336 may thereby be operated to include pressure, temperature, power, and time settings, as examples, for a given application. According to the disclosure, data is heuristically obtained for, for instance, a given apparel and transfer design. Best practices are employed based on experience obtained in some locations or with one transfer press, as examples, and applied to other transfer presses, apparel designs, transfers, and at other locations. Statistical data is accumulated in, for instance, database 322, and best practices from the heuristic data are accumulated, analyzed, and optimized in order that settings may be collectively improved based on what is learned from other applications, locations, etc. For instance, a first location may operate several presses, and even several models of presses. Data may thereby be accumulated in database 322, analyzed, and optimized such that settings may be refined or revised for use at, for instance, a second location. Parameters particular to a specific type of apparel—such as fabric thickness, fabric type (e.g., cotton), or specific to the transfer.

Any portion of system 300, e.g., devices 302 and server 305, may include a computing system and/or device that includes a processor 306 and a memory 308. Computing systems and/or devices generally include computer-executable instructions, where the instructions may define operations and may be executable by one or more devices such as those listed herein. Computer-executable instructions may be compiled or interpreted from computer programs created using a variety of programming languages and/or technologies, including, without limitation, and either alone or in combination, Java language, C, C++, Visual Basic, Java Script, Perl, SQL, PL/SQL, Shell Scripts, Unity language, etc. System 300, e.g., devices 302 and server 305 may take many different forms and include multiple and/or alternate components and facilities, as illustrated in the Figures. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., devices 302 and server 305) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices such as devices 302, and server 305 may include, without limitation, mobile devices, cellular phones, smart-phones, superphones, next generation portable devices, mobile printers, handheld or desktop computers, notebooks, laptops, tablets, wearables, virtual or augmented reality devices, secure voice communication equipment, networking hardware, computer workstations, or any other computing system and/or device.

Further, processors such as processor 306 receive instructions from memories such as memory 308 or database 322 and execute the instructions to provide the operations herein, thereby performing one or more processes, including one or more of the processes described herein. Such instructions and other guidance information may be stored and transmitted using a variety of computer-readable mediums (e.g., memory 308 or database 322). Processors such as processor 306 may include any computer hardware or combination of computer hardware that is configured to accomplish the purpose of the devices, systems, operations, and processes described herein. For example, processor 306 may be any one of, but not limited to single, dual, triple, or quad core processors (on one single chip), graphics processing units, and visual processing hardware.

A memory such as memory 308 or database 322 may include, in general, any computer-readable medium (also referred to as a processor-readable medium) that may include any non-transitory (e.g., tangible) medium that participates in providing guidance information or instructions that may be read by a computer (e.g., by the processors 306 of the devices 302 and server 305). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Further, databases, data repositories or other guidance information stores (e.g., memory 308 and database 322) described herein may generally include various kinds of mechanisms for storing, providing, accessing, and retrieving various kinds of guidance information, including a hierarchical database, a set of files in a file system, an application database in a proprietary format, a relational database management system (RDBMS), etc. Each such guidance information store may generally be included within (e.g., memory 308) or external (e.g., database 322) to a computing system and/or device (e.g., devices 302 and server 305) employing a computer operating system such as one of those mentioned above, and/or accessed via a network (e.g., system 300 or network 320) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above. Memory 308 and database 322 may be connected to or part of any portion of system 300.

According to the disclosure, presses may be operable manually or automatically. For instance, press 100 above may be operated automatically as described above, in which controller 116 may operate press 100 in an automated mode to include pressure, temperature, power, and time settings, as examples, for a given application.

However, according to the disclosure, some press models may be operated in manual mode, as well. In such applications, pressure, temperature, power, and time settings, as examples, may be manually controlled, or manually entered. Thus, aside from the automated operation of the above-described examples (FIGS. 1-10B), the following manual transfer press design includes an upper platen, lower platen, controller, etc. . . . having similar features and operated in a similar fashion.

Figure 12A:
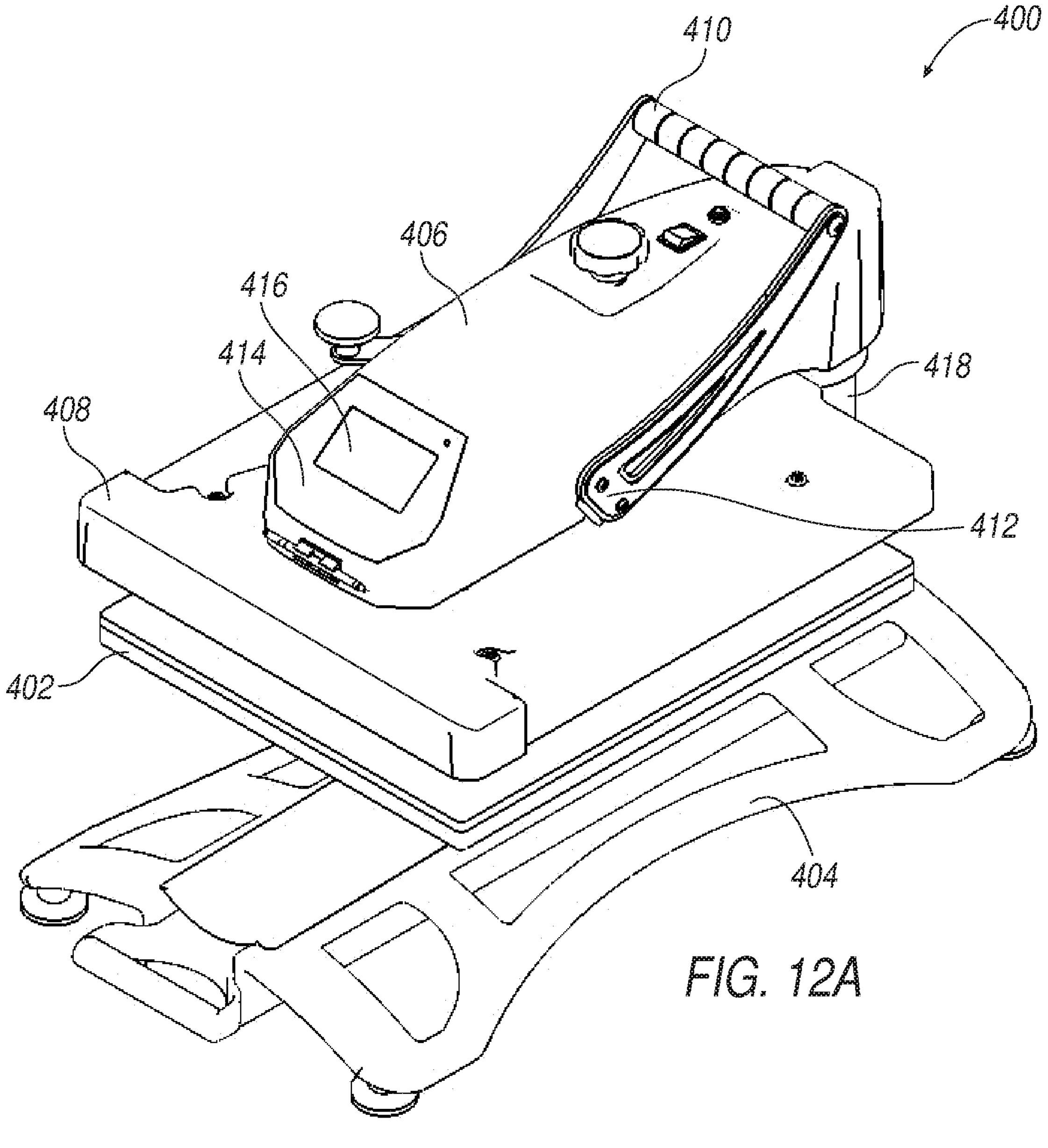
FIG. 12A illustrates a perspective view of a manual press in an open position.
Figure 12B:
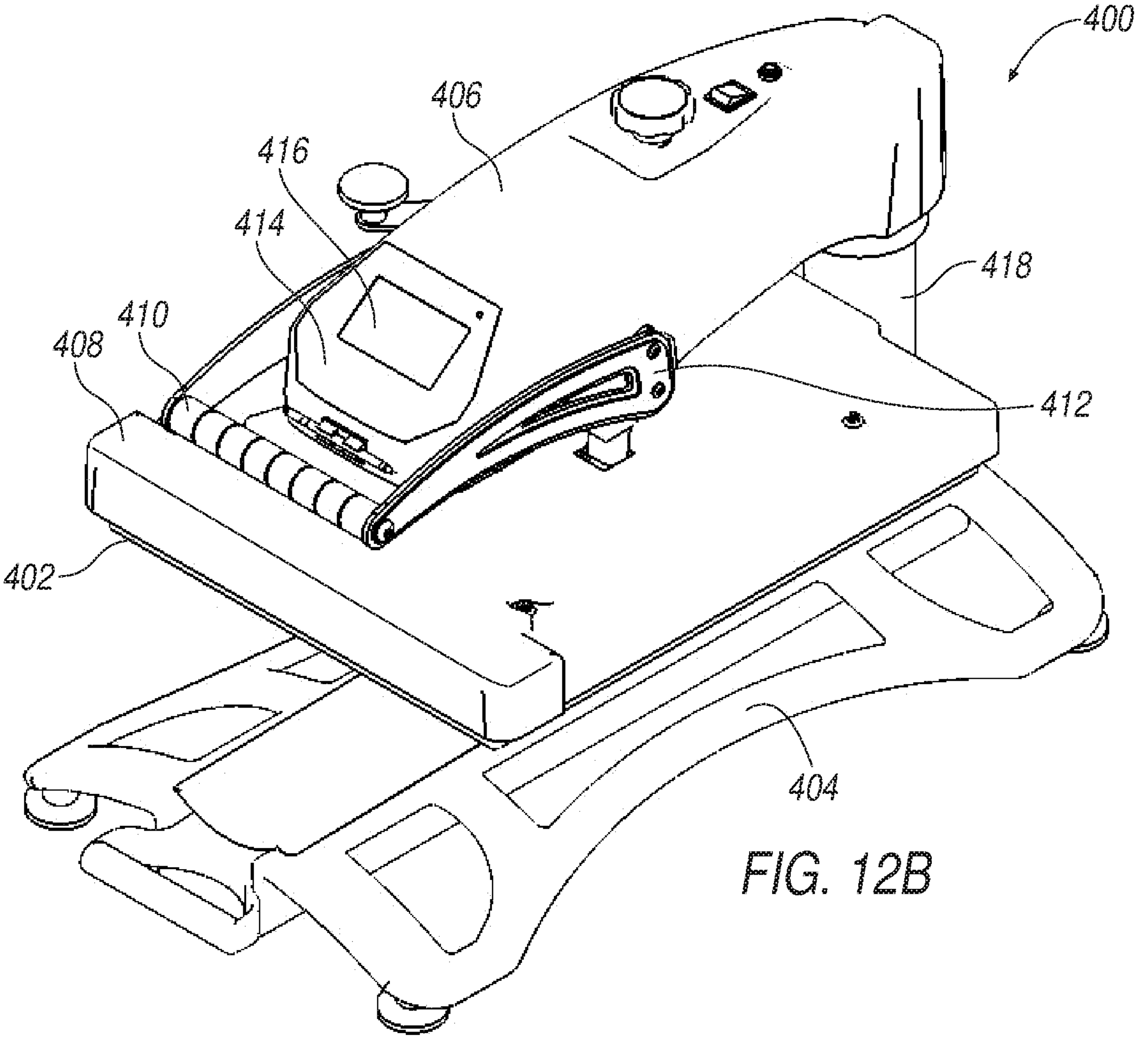
FIG. 12B illustrates a perspective view of the manual press of FIG. 12A in a closed position.

For instance, referring to FIG. 12A, press 400 includes a lower platen 402, which may be similar to lower platen 102 described above, mounted on a stand 404 or base frame, and a support head 406 supporting an upper platen 408 above the lower platen 402. Upper platen 408, similarly, may be operated similarly to upper platen 108 described above. Force may be applied to upper platen 408 through a pair of shafts (not shown). The mechanism for displacing the upper platen to impart a force to the lower platen may include a handle 410, configured to operate as a lever that rotates about a rotational center 412 that passes through support head 406, shown in a closed position in FIG. 12B. In one example, platens 402, 408 may include a work structure of a machine tool and a generally flat plate of a press configured to press a material, e.g., a garment, to allow placement of indicia on the garment.

Support head 406 may position the upper platen 408 in a substantially parallel alignment with lower platen 402 as it approaches a closed position. Moreover, the closed position of the upper platen 408 can be varied, e.g., to raise the level of upper platen 408 with respect to lower platen 402. As a result, regardless of the thickness of the material, the transfers to be applied, or the thickness of the support pads to be used between the upper and lower platens 408, 402, the alignment of the upper and lower platens 408, 402 avoids uneven pinching of the material and the transfers positioned between upper and lower platens. Pads (not shown) may also assist the pressure distribution regardless of irregularities in the thicknesses of the heat applied transfers and the apparel to which it is applied.

At least one of the platens, e.g., upper platen 408, includes a heating element 109 such as conventional electrically resistive heating elements and the like, which may be formed as serpentine or otherwise wound throughout the surface area of the upper platen 408. The heating element is coupled to a typical power supply through a switch and/or a controller 414 (which has similar features to controller 116 described above), and may be configured for adjusting the temperature of the heating element, e.g., by way of controller 414. Further, the temperature of the heating element may be adjusted at a visual display 416 which interfaces with controller 414. Upper platen 408 may also carry a thermocouple sensor (not shown) which is wired in a conventional manner to generate temperature information for controller 414, which may display such information via display 416. Display 416 may thus be mounted for exposure to an area occupied by a press operator as typically positioned for manipulating and controlling the press 400. The electrical circuit for the heating element may also include a temperature control such as a thermostat.

Controller 414 may generally include control elements for implementing settings that may be established therein using, for instance, visual display 416. Controller 414 may generally provide time monitoring, temperature monitoring, pressure monitoring, and control, as examples. Display 416 may further include various readout displays, e.g., to allow display of a force, temperature, or time associated with operation of the press 400. Moreover, display 416 may allow for manipulation of controller 414 by a user, e.g., by way of a touchscreen interface. Display 416 may thereby be used by the operator to adjust an amount of force applied by upper platen 408 to lower platen 402, a cycle time for the force to be applied, and a temperature of the heated platen(s), as examples. Controller 414 may operate press 400 in a manual mode to include application of pressure, temperature, power, and time settings, as examples, for a given application. In one example, temperature, power, and time settings may be displayed for a manual operator, such that the operator can manually operate press 400 via handle 410, with temperature, power, and time settings entered by the user or by a remote device as a program, via controller 414.

Controller 414 may facilitate a variety of user-customized settings for use of the press 400. In one exemplary illustration, controller 414 includes a memory for storing one or more programs associated with application of an indicia to a garment, including a predetermined temperature, and/or a predetermined cycle time associated with the upper platen 408. In another exemplary illustration, the programs may include a plurality of stages in the application process, e.g., where the upper platen 408 is to be applied to a garment with a first pressure that is applied to a garment for a first cycle time, and a second pressure that is subsequently applied for a second cycle time. In some examples, the pressure and cycle time are different, such that a variety of different pressures and cycle times may be manually applied by the transfer press 400. For instance, pressure may be applied by manually setting or establishing spacing between lower platen 402 and upper platen 408, and pressure applied to change from the first pressure to the second pressure may be displayed to the user on display 416, such that the user can manually operate and adjust the platen spacing to achieve the different pressures.

Support head 406 generally supports and aligns upper platen 408 with respect to lower platen 402. Support head 406 may also be pivotable about an axial support 418, away from lower platen 402, to allow placement of a garment upon lower platen 402.

Controller 414 may generally include computational and control elements (e.g., a microprocessor or a microcontroller). Controller 414 may generally provide time monitoring, temperature monitoring, and pressure monitoring, as examples. Display 416 may further include various readout displays, e.g., to allow display of a force, temperature, or time associated with operation of the press. A given program and its respective settings may be selected via use of display 416. That is, a program may be displayed to a user so that the user can input the various time and temperature settings, as well as to establish the pressure settings as described above. In one example, time and temperature settings may be established via controller 414, but then manually operated to apply and release pressure via handle 410.

Controller 414 may facilitate a variety of user-customized settings for use of press 400. In one exemplary illustration, controller 414 includes a memory for storing one or more programs associated with application of an indicia to a garment, including a predetermined temperature, desired force, and/or a predetermined cycle time associated with the upper platen 408. In another exemplary illustration, the programs may include a plurality of stages in the application process, e.g., where the upper platen 408 is applied to a garment with a first pressure that is applied to a garment for a first cycle time, and a second pressure that is subsequently applied for a second cycle time. In some examples, the pressure and cycle time are different, such that a variety of different pressures and cycle times may be applied by the transfer press 400.

Figure 13:
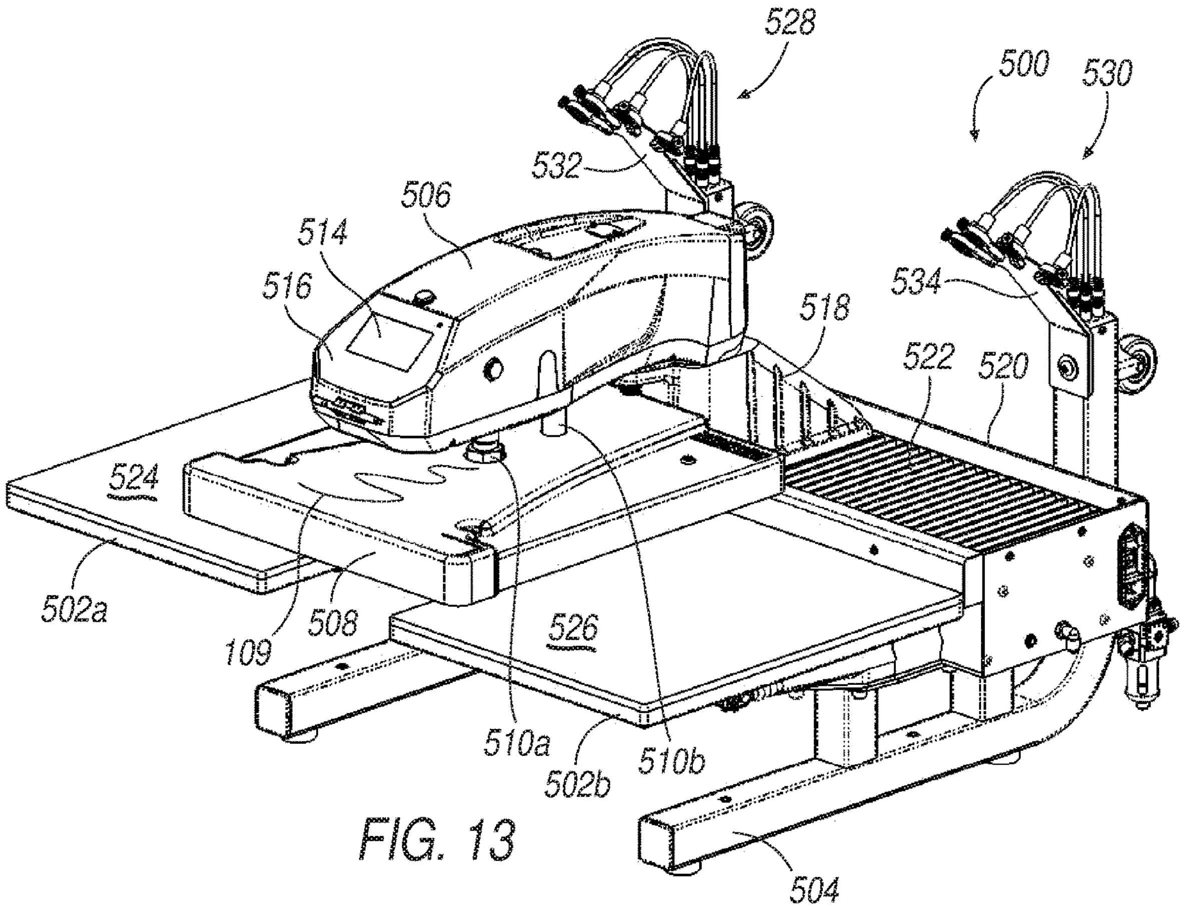
FIG. 13 illustrates a perspective view of a two-platen automated heat applied transfer press.

FIG. 13 illustrates a two-platen automated heat applied transfer press 500. Having two platens, press 500 otherwise operates having upper and lower platens, a controller, heating elements, etc. . . . as described in the above single platen designs (both automatic and manual designs, as described in FIGS. 1-10B and 12A-12B above). Press 500 operates in an automated fashion, having automated control of temperature, pressure, and time of operation as described above with respect particularly to press 100 of FIGS. 1A, 1B, and 2 above.

The press 500 includes a first lower platen 502*a* and a second lower platen 502*b* mounted on a stand 504 or base frame, and a support head 506 supporting an upper platen 508 above the lower platens 502*a*, 502*b*. Force may be applied to upper platen 508 through a pair of shafts 510*a*, 510*b*. The mechanism for displacing the upper platen 508 to impart a force to lower platens 502*a*, 502*b* may include a pneumatic pressure chamber, as similarly described and illustrated in FIG. 2.

Operation of press 500 is carried out in a fashion similar to that of press 100 described above. However, in addition, support head 506 may be moved and positioned over each of lower platens 502*a*, 502*b* using a controller 516 and a visual display 514 which interfaces with controller 516. Upper platen 508 is supported by a linearly moveable support structure 518, moveable from a first position 524 over lower platen 502*a*, to a second position 526 over lower platen 502*b*. Support structure 518 is positioned within a containment structure 520 having a bellows-like flexible protective device 522, to either side of moveable support structure 518, which flexes and retracts in an accordion-like fashion as moveable support structure 518 is moved to left and right. Contained within containment structure 520 is an electric motor or pneumatic actuator (not visible) controlled by controller 516, operable to move support structure 518 between first position 524 and second position 526. Each of first and second positions 524, 526 includes a corresponding set of optical devices 528, 530 supported by respective brackets 532, 534. Each optical device 528, 530 may be laser lights that are separately positioned to shine its light onto each respective lower platen 502*a*, 502*b*, and positioned to provide an image having visual guidance or location information for a user to place a shirt, and a corresponding transfer on top of the shirt. In one example, one or more of devices 528, 530 may be coupled to controller 516, having video data contained therein such that a video image may projected onto a respective lower platen 502*a*, 502*b* to help with transfer/alignment onto the garment, or to provide video images to assist in garment or transfer placement.

Thus, in operation, controller 516 causes linearly moveable support structure 518 to move left to right, and vice versa, between first position 524 and second position 526. When at one of the positions 524, 526, then controller 516 causes an automated press operation to apply a set amount of heat to be applied, with a given pressure, and for a set duration of time. Meanwhile, at the other of the positions 526, 524, a user removes a shirt that has just been pressed having a transfer attached, and the user places a new shirt and positions a transfer on top of the shirt, using corresponding set of laser lights 528, 530 accordingly.

Each of the disclosed presses includes a controller, operable as described below. That is, press 100 illustrated in FIGS. 1A, 1B, and 2 includes controller 116. Likewise, press 400 illustrated in FIGS. 12A and 12B includes controller 414, and press 500 of FIG. 13 includes controller 516.

Figure 14:
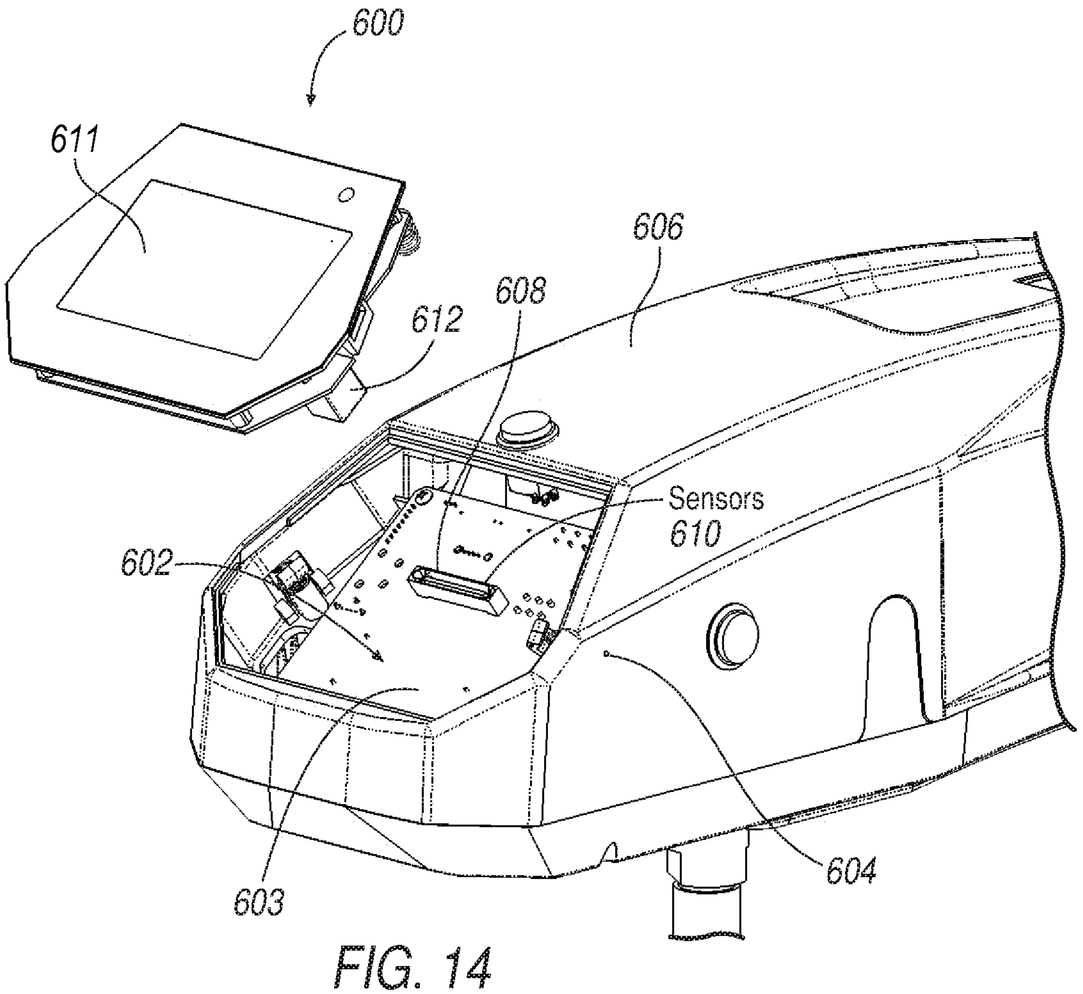
FIG. 14 illustrates an exemplary removable controller according to the disclosure.

FIG. 14 shows an exemplary removable controller 600, corresponding press 100 of FIGS. 1A, 1B, and 2. However, it is contemplated for the following discussion that controller 600 generally corresponds to each of the controllers 116, 414, and 516 as described above. Each press described herein thereby includes a controller that may be separately interfaced with a network, such that programs may be downloaded from the network, and data may be acquired for each press during usage.

As seen in FIG. 14, controller 600 is removable as a stand-alone module from a pocket 602 in which controller 600 is positioned. Controller 600 includes interfacing mechanical features to lock controller 600 within pocket 602. Pocket 602 includes a power board 603 having a USB host chip that allows for future expansion and system upgrades, without the need for costly hardware upgrades. Power board 603 may thereby include, for instance, an RFID for identifying platen size within a particular press, or a barcode scanner for providing a quick user login, as examples. A pin hole 604 is provided on one or both sides of a support head 606 (corresponding to support heads 106, 406, and 506 above), into which a pointed end of, for instance, a paper clip may be pressed to release or disengage controller 600. Controller 600 includes at least one electrical interface, not shown, which interfaces with an interface 608 positioned within pocket 602. Controller 600 is thereby electrically connected to a number of sensors 610 positioned within support head 606. As described above, sensors 610 may be referred to broadly and may apply to any sensor or electrical device that provides control information to the press. For instance, sensors 610 may include temperature, pressure, timing circuits, and the like. Sensors 610 in any given press correspond generally to each of sensors 316 as described above with respect to system 300 of FIG. 11. Sensors 610 are thereby accessible via network 320 as describe above.

Each controller 600 may generally include computational and control elements (e.g., a microprocessor or a microcontroller). Controller 600 may generally provide time monitoring, temperature monitoring, pressure monitoring, and control, as examples. A display 611 may further include various readout displays, e.g., to allow display of a force, temperature, or time associated with operation of the press. Moreover, display 611 may allow for manipulation of the controller 600 by a user, e.g., by way of a touchscreen interface. Display 611 may thereby be used by the operator to adjust an amount of force applied by the platens, a cycle time for the force to be applied, and a temperature of the heated platen(s), as examples. Controller 600 may operate automated pressed in an automated mode to include pressure, temperature, power, and time settings, as examples, for a given application, and may provide corresponding data and information to a user for presses operated in manual mode. A given program and its respective settings may be selected via use of display 611.

Controller 600 may facilitate a variety of user-customized settings for use of the press. In one exemplary illustration, controller 600 includes a memory for storing one or more programs associated with application of an indicia to a garment, including a predetermined temperature, a predetermined force, and/or a predetermined cycle time associated with the corresponding upper platen. In another exemplary illustration, the programs may include a plurality of stages in the application process, e.g., where the upper platen is applied to a garment with a first pressure that is applied to a garment for a first cycle time, and a second pressure that is subsequently applied for a second cycle time. In some examples, the pressure and cycle time are different, such that a variety of different pressures and cycle times may be applied by the transfer press. In the two-platen example of FIG. 13, controller 600 may include additional programming information corresponding to movement of moveable support structure 518. Controller 600 may include a memory, having the ability to store a large number of application programs.

Controller 600 includes a wired or wireless connection 612, such as a transceiver, communicatively coupled to network 320. Controller 600 may be removed and replaced by pressing a pointed object into the one or more pin holes 604. Controller 600 may thereby have hardware upgrades sent to sites having presses therein. Or, controller 600 may be simply replaced in the event that, for instance, a hardware failure occurs within controller 600.

Connection 612 thereby provides connection to an internal network, such as network 320 of system 300 (FIG. 11). Network 320 may be connected to, for instance, the Internet, or network 320 may be an internal network having no access from outside users without first passing through a firewall, for instance, as an example. That is, referring back to FIG. 11, each press 332, 334, 336 includes not only sensor information, but computer program information, as well, particular to each respective press 332, 334, 336. Accordingly, many presses may be managed via a device, such as devices 302*a*, 302*b*, and/or 302*c*. Data may be stored in database 322. Programs for any of the given presses 332, 334, 336 may thereby be developed and optimized, based on information received and agglomerated from the many types of operations that may be carried out in any number of locations. In addition, print jobs may be accessed across network 320, and usage records may be collected as well. Firmware upgrades, likewise, can be sent to any particular controller 600 at any given location “over the air”.

Thus in summary, disclosed herein is a concealed latch system that holds controller 600 in place during operation. When actuated by insertion of, for instance, a paper clip, the controller 600 can be disassembled for repair, or readily replaced with a new controller. Heuristics may be developed based off of controller 600 records and statistical data uploaded to the server 305, where it is aggregated and analyzed to provide comparative performance metrics. As such, operational and performance information may be gathered as large amounts of data, statistically analyzed to determine usage patterns, setting improvements, and the like, which may provide insights to not only particular applications, but to particular locations as well. In such fashion, existing operations may be improved, with improved heuristics, and new uses (such as new sites being set up at new locations) can also anticipate usage and other setting requirements based on the accumulated data. Knowledge gained may thereby be applied to revise, for instance, temperature, pressure, or time settings for improving the applications at other locations.

Figure 15:
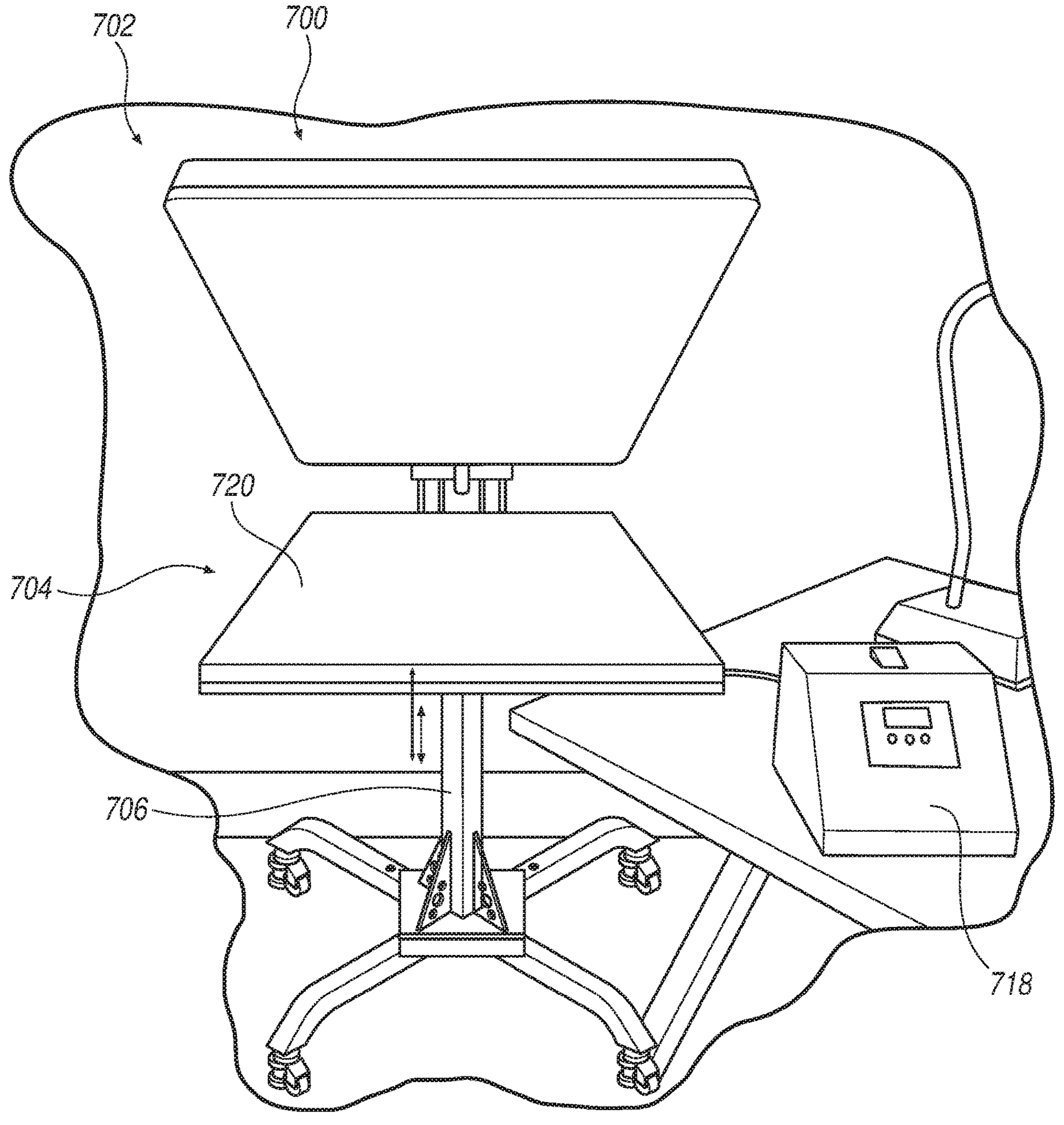
FIG. 15 illustrates an exemplary press having a cooled lower platen operation, according to the disclosure.
Figure 16:
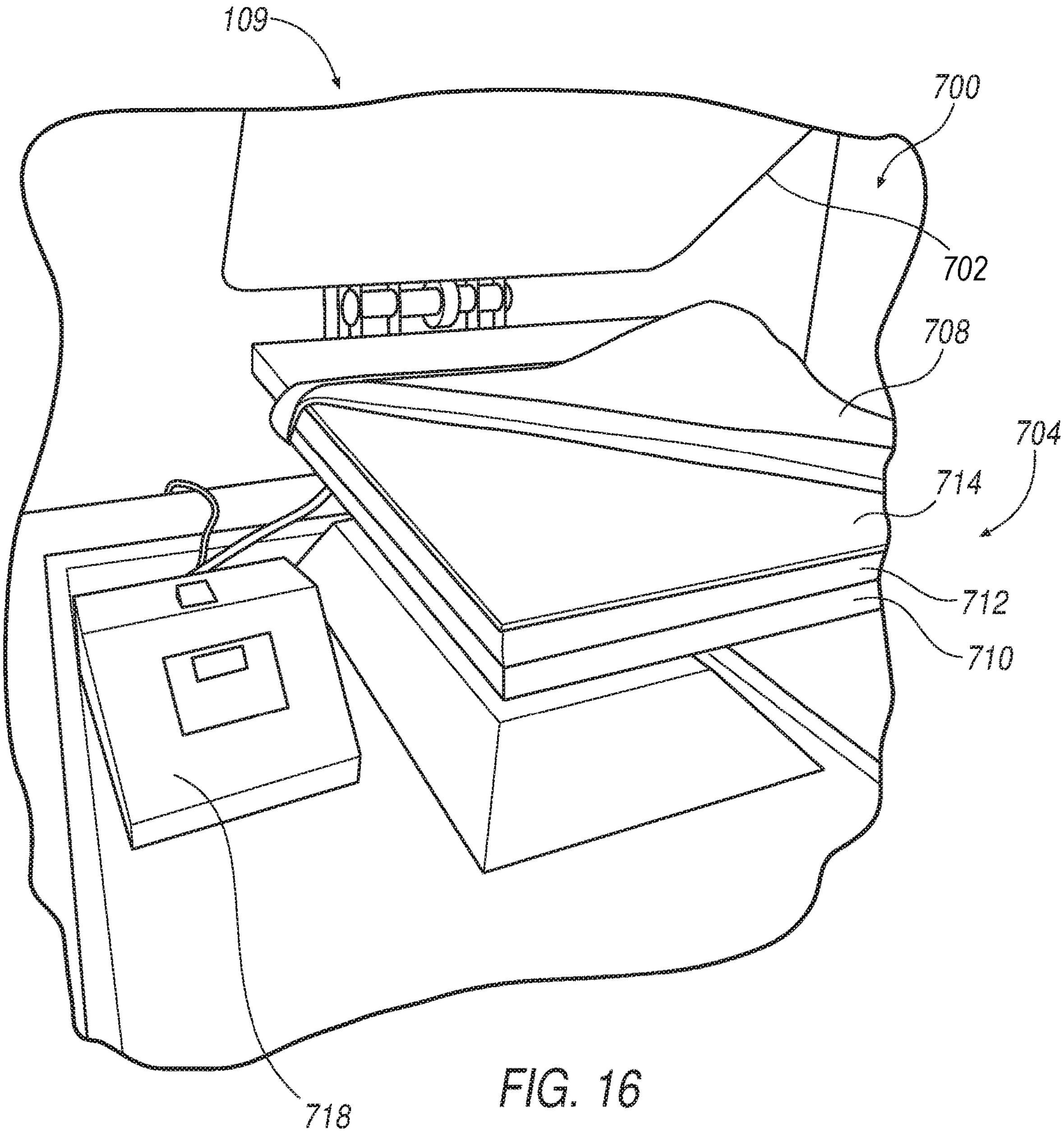
FIG. 16 illustrates the exemplary press of FIG. 15, having its cover pad folded back to expose elements of the disclosed assembly.

Referring now to FIG. 15, an exemplary press 700 having a heated lower platen operation is illustrated, according to the disclosure. Aspects of the disclosed press 700 are incorporated into all presses illustrated and discussed in the previous figures herein, FIGS. 1-14. That is, press 700 includes an upper platen assembly 702 and a lower platen assembly 704, as well as a stand 706. FIG. 16 shows press 700 having a stretching cover 708, otherwise referred to as a cover material or cover pad that has been pulled back, exposing a lower platen element 710, a heating element and thermally insulating material enclosure 712, and a thermally conductive pad 714 positioned between stretching cover 708 and material enclosure 712.

Press 700 includes an upper platen assembly 702 having a first heating element (present but not visible in FIGS. 15 and 16, but as illustrated as element 109 in previous figures), and lower platen assembly 704 disposed beneath the upper platen assembly 702. Lower platen assembly 704 includes thermally conductive pad 714, and a support head, such as support head 106 illustrated above, adapted to move upper platen assembly 702 between an open position and a closed position with respect to lower platen assembly 704. A heater controller 116 is operatively coupled to heating element 109, and a separate heater controller, 718, is operatively coupled to heating element and thermally insulating enclosure 712. In the illustrated examples, heater controller 116 is separate from heater controller 718. However, it is contemplated that heater control for both heating elements 109 and 712 may be effected through the use of a single controller, such as only heater controller 116 or only heater controller 718. In either case (separate controllers or both heating elements 109, 712 controlled through one controller), in one example controller(s) 116/718 are configured to separately apply power to heating element 109 and to heating element and thermally insulating enclosure 712. In another example, controller(s) 116/718 are configured to apply power simultaneously to heating element 109 and to heating element 712.

Heater controller 718 is further configured to heat upper platen assembly 702 to a first temperature via heating element 109, and heat lower platen assembly 704 to a second temperature via second heating element and thermally insulating enclosure 712. In one example, the first temperature is different from the second temperature. According to the disclosure, lower platen assembly 704 further includes lower platen element 710, fabricated as a metal such as aluminum. Lower platen assembly 704 includes heating element and thermally insulating enclosure 712, and thermally conductive pad 714 positioned on lower platen element 710, and covered by stretching cover 708.

According to the disclosure, heat is applied to lower platen assembly 704 such that a top surface 720 of lower platen assembly 704 is sufficiently heated so that garments may be pressed for applying heat transfers or other indicia thereto. That is, with a heated lower platen assembly 704 printing option, heat is applied to both top and bottom (adhesive side) with independently controlled heat sources. Heating from the top and bottom allows for a lower process temperature, reduced application time, and elimination of the need to preheat before a final print. A pillow-like construction of the assembly provides an even distribution of pressing force, allowing it to accommodate printing near buttons, zippers, and seams. Soft edges prevent stretch marks around the perimeter of the platen. The result thereby eliminates the potential for heat application marks being left behind.

According to one example of the disclosure, and merely for illustrative purposes, a voltage applied to heating element 712 is one or both of 120 V and 240 V. A current of up to 15 A is available. For an exemplary area of 16" by 20", and an exemplary power of 320 W, for a power density of 5.6 W/in$^2$, a total power of 1792 W results, further causing a working temperature of the heating source of 370° F.

It is contemplated that other platen sizes used in the industry may benefit from the disclosed subject matter, as well. For instance, platen sizes may include 6" by 6", 6" by 20", 16" by 16", 15" by 15", or 11" by 15", as examples. Accordingly, rather than express the exemplary specifications as absolute power requirements, the disclosed subject matter is discussed in terms of power and insulating resistance per unit area. Thus, for the above example and as stated, a power density of 5.6 W/in$^2$ is discussed.

According to the disclosure, it is desirable to provide a thermal system in which operation of heating element and thermally insulating enclosure 712 results in a sufficiently warm upper surface 720, while leaving lower platen element 710 sufficiently cool to the touch (so as to avoid burns and discomfort to operators who may inadvertently have skin or body parts come in contact with lower platen element 710), such as 110° F. Accordingly, stretching cover 708 and thermally conductive pad 714 include a desired path for thermal conduction, whereas heating element and thermally insulating enclosure 712 includes not only the soft "pillow like" construction, but provides insulating features as well. That is, heat generated in heating element and thermally insulating enclosure 712 will tend to conduct (or transfer) in both directions, but as known in the art, the amount of heat transfer in the two directions will be dependent on the thermal resistance both above and below heating element and thermally insulating enclosure 712. Accordingly, heating element and thermally insulating enclosure 712 is designed having a thermal resistance on its bottom that is greater than that of stretching cover 708 and thermally conductive pad 714. As is known, thermal resistance, in conduction heat transfer, is dependent on both material thickness and material thermal conductivity. Thus, to achieve the desired goal of having sufficient working temperature on upper surface 720, and a sufficiently cool temperature on lower platen element 710, the thermal resistance of heating element and thermally insulating enclosure 712 is much greater than that of stretching cover 708 and thermally conductive pad 714, according to the disclosure. In addition, the soft "pillow like" construction is of sufficient thickness not only to provide the insulating features as described, but is also sufficiently soft or compliant in order that fabrics may have applied thereto heat transfers, in which the fabrics may also include buttons, zippers, and the like, which may be physically compressed into stretching cover 708 and thermally conductive pad 714, such that stretching cover 708 and thermally conductive pad 714 deform locally while allowing for the heat transfer process to occur.

In the disclosed example, a thermal resistance of 0.043 K-m$^2$/W is obtained for stretching cover 708 and thermally conductive pad 714, using materials having a thermal conductivity of approximately 0.75 BTU-in/hr-ft$^2$-° F. (which corresponds to 0.11 W/m-K) and a material thickness of 0.00476 m (3/16"). In this example, as well, a thermal resistance of 0.85 K-m$^2$/W is obtained for a thermally insulating material on the bottom of heating element and thermally insulating enclosure 712, using a material having a thermal conductivity of 0.2 BTU-in/hr-ft$^2$-° F. (which corresponds to 0.03 W/m-K) and a material thickness of 0.0254 m (1").

And, the disclosed subject matter does not require such thermal resistances, thickness, or material thermal conductivity. Rather, it is contemplated that the disclosure meets its requirements by having sufficiently warm processing or operating temperature on surface 720, while leaving lower platen element 710 sufficiently cool to the touch.

According to the disclosure, press 700 includes a stand 706 positioned on a ground surface 220 and defining a throat spacing beneath the lower platen assembly 704, the stand 706 being spaced horizontally away from a geometric center A of the lower platen assembly 704, as discussed above and with respect to FIGS. 1-14.

Disclosed also is a method of operating a heat press. The method includes heating upper platen assembly 702 using first heating element 109, upper platen assembly 702 having heating element 109 thermally attached thereto. The method includes heating lower platen assembly 704 using heating element and thermally insulating enclosure 712, operatively coupling heater controller 116/718 to heating element 109 and to a heating element of heating element and thermally insulating enclosure 712, heater controller 116/718 configured to separately apply power to heating element 109 and heating element and thermally insulating enclosure 712. The method includes moving upper platen assembly 702 between an open position and a closed position with respect to lower platen assembly 704 to apply heat to at least a fabric that is positioned between upper platen assembly 702 and lower platen assembly 704.

The disclosed method further includes heating upper platen assembly 702 to a first temperature via the heating element 109, and heating lower platen assembly 704 to a second temperature via heating element 714, wherein the first temperature is different from the second temperature.

Also according to the disclosure, a method of modifying a heat press includes providing a heat press 700 having upper platen element 108 and lower platen element 710, upper platen element 108 having heating element 109 thermally coupled thereto, the lower platen element 710 disposed beneath upper platen element 108, heat press 700 having a support head 106 adapted to move upper platen element 108 between an open position and a closed position with respect to lower platen element 710. The method further includes positioning heating element and thermally insulating enclosure 712 on lower platen element 710, and operatively coupling heater controller 116/718 to heating element 109 and to heating element and thermally insulating enclosure 712, heater controller 116/718 configured to separately apply power to the heating element 109 and heating element and thermally insulating enclosure 712.

Figure 17:
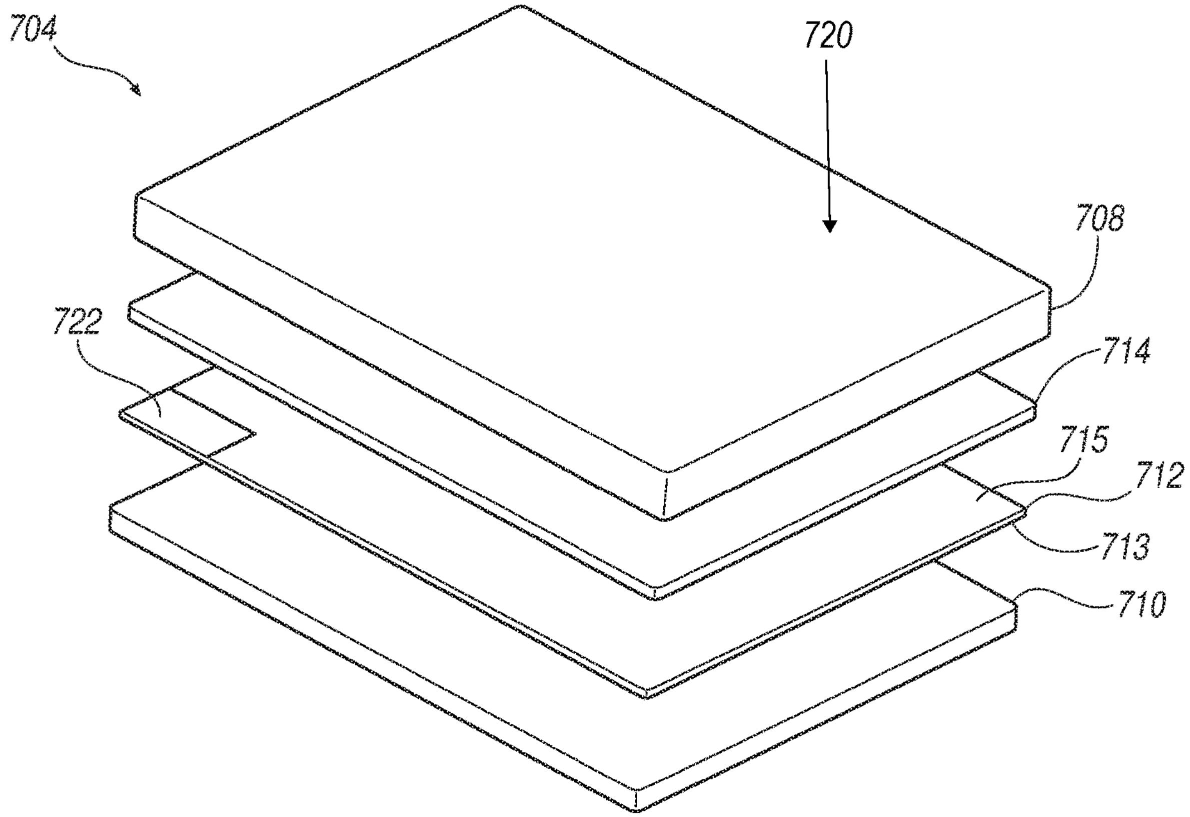
FIG. 17 illustrates an expanded view of components of the disclosed press, and particularly of the lower platen, according to the disclosure.

FIG. 17 illustrates an expanded view of components of the disclosed press, and particularly of lower platen assembly 704, according to the disclosure. Lower platen assembly 704 includes stretching cover 708, also referred to as cover material or cover pad, exposing lower platen element 710, heating element and thermally insulating material enclosure 712 (having an insulating material 713 beneath a heating element 715 and both 713, 715 being stitched together and illustrated as one unit or enclosure 712), and a thermally conductive pad 714 positioned between stretching cover 708 and material enclosure 712. Heating element and thermally insulating material enclosure 712 includes a temperature sensor 722, positioned in thermal contact therewith. Temperature sensor 722 is electrically coupled to a controller, such as controller 116 and/or controller 718, in order that temperature feedback may be used to adjust an amount of power dissipated in the heating 715 element of heating element and thermally insulating material enclosure 712. According to the disclosure, temperature sensor 722 may be a thermocouple, RTD, or any sort of sensor that may be used to convert temperature to an electrical output that can be converted to temperature.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as “a,” “the,” “the,” etc. should be read to recite one or more of the indicated elements unless a claim recites an explicit limitation to the contrary.

The invention claimed is:

1. A press, comprising:

an upper platen assembly having a first heating element;

a lower platen assembly having a second heating element;

a support head configured to move the upper platen assembly between an open position and a closed position with respect to the lower platen assembly such that the lower platen assembly is disposed beneath the upper platen assembly when in the closed position; and at least one heater controller operatively coupled to the first heating element and to the second heating element, and configured to separately apply electrical power to the first heating element and to the second heating element independently of one another.

2. The press according to claim 1, wherein the at least one heater controller is further configured to heat the upper platen assembly to a first temperature via the first heating element, and heat the lower platen assembly to a second temperature via the second heating element, wherein the first temperature is different from the second temperature.

3. The press according to claim 1, wherein the lower platen assembly includes:

a lower platen element;

the second heating element; and a thermally insulating material positioned between the lower platen element and the second heating element.

4. The press according to claim 3, wherein the thermally insulating material includes a thermal resistance equal to or greater than 0.85 $K/W\text{-}m^2$.

5. The press according to claim 3, wherein the lower platen assembly includes:

a thermally conductive pad positioned on the second heating element; and a cover covering a surface of the thermally conductive pad facing the upper platen assembly and disposed at partially surrounding the thermally conductive pad, the second heating element, the thermally insulating material, and the lower platen element.

6. The press according to claim 5, wherein at least one of the cover and the thermally conductive pad has a thermal resistance that is equal to or less than 0.043 $K/W\text{-}m^2$.

7. The press of claim 1, further comprising a stand positioned on a ground surface and defining a throat spacing beneath the lower platen assembly, the stand being spaced horizontally away from a geometric center of the lower platen assembly.

8. A method of operating a heat press, comprising heating an upper platen assembly using a first heating element, the upper platen assembly having the first heating element thermally attached thereto;

heating a lower platen assembly using a second heating element, the lower platen assembly having the second heating element thermally attached thereto;

operatively coupling at least one heater controller to the first heating element and to the second heating element;

supplying a first amount of electrical power to the first heating element separately and independently from the second heating element via the at least one heater controller;

supplying a second amount of electrical power to the second heating element separately and independently from the first heating element via the at least one heater controller; and moving the upper platen assembly between an open position and a closed position with respect to the lower platen assembly to apply heat to at least a fabric that is positioned between the upper platen assembly and the lower platen assembly.

9. The method of claim 8, further comprising heating the upper platen assembly to a first temperature via the first heating element, and heating the lower platen assembly to a second temperature via the second heating element, wherein the first temperature is different from the second temperature.

10. The method of claim 8, wherein:

the lower platen assembly includes:

a lower platen element;

the second heating element;

a thermally insulating material positioned between the lower platen element and the second heating element; and a cover disposed at partially surrounding the second heating element, the thermally insulating material, and the lower platen element; and the method further comprises positioning the fabric on the cover of the lower platen assembly between the upper platen assembly and the lower platen assembly.

11. A method of modifying a heat press, comprising:

providing a heat press having an upper platen element and a lower platen element, the upper platen element having a first heating element thermally coupled thereto, the lower platen element disposed beneath the upper platen element, the heat press having a support head adapted to move the upper platen element between an open position and a closed position with respect to the lower platen element;

positioning a second heating element in proximity to the lower platen element;

operatively coupling at least one heater controller to the first heating element and to the second heating element; and configuring the at least one heater controller to separately and independently apply electrical power to the first heating element and the second heating element.

12. The method of claim 11, further comprising positioning a thermally insulating material having a soft pillow-like deformable construction between the lower platen element and the second heating element, wherein the lower platen element, the second heating element, and the thermally insulating material define a lower platen assembly.

13. The method of claim 12, further comprising positioning a cover having a thermal resistance equal to or less than 0.043 $K\text{-}m^2/W$ on the second heating element, wherein the cover is a component of the lower platen assembly.

14. The method of claim 11, further comprising:

arranging a thermally insulating material having a soft pillow-like deformable construction between the lower platen element and the second heating element;

arranging a thermally conductive pad on the second heating element; and stretching a cover around the thermally conductive pad, the second heating element, the thermally insulating material, and the lower platen element such the cover covers a surface of the thermally conductive pad facing the upper platen assembly and at least partially surrounds the thermally conductive pad, the second heating element, the thermally insulating material, and the lower platen element;

wherein the cover, the thermally conductive pad, the second heating element, the thermally insulating material, and the lower platen element define a lower platen assembly.

15. The method of claim 11, wherein the lower platen element and the second heating element are components of a lower platen assembly, the lower platen assembly having an upper portion facing the upper platen element and disposed on an opposite side of the lower platen assembly from the lower platen element, the method further comprising thermally insulating the lower platen element such that the lower platen element remains sufficiently cool-to-the-touch when the upper portion of the lower platen assembly is heated to an operating temperature via the at least one heater controller.

16. The press according to claim 1, wherein:

the electrical power supplyable to the first heating element via the at least one heater controller is a first amount of electrical power;

the electrical power supplyable to the second heating element via the at least one heater controller is a second amount of electrical power; and the first amount of electrical power is different from the second amount of electrical power.

17. The press according to claim 1, wherein the at least one heater controller includes at least two independently operable heater controllers, a first heater controller of the at least two heater controllers operatively coupled to the first heating element and a second heater controller of the at least two heater controllers operatively coupled to the second heating element.

18. The press according to claim 1, wherein at least a portion of the lower platen assembly, including a surface of the lower platen assembly facing the upper platen assembly, has a soft pillow-like deformable construction.

19. The method of claim 8, further comprising deforming the lower platen assembly around at least one of i) a seam, ii) a button, and iii) a zipper of the fabric positioned between the upper platen assembly and the lower platen assembly facilitating printing in a region proximal the at least one of i) the seam, ii) the button, and iii) the zipper.

20. The method of claim 8, wherein further comprising:

heating an upper portion of the lower platen assembly facing the upper platen assembly to an operating temperature via the second heating element; and thermally insulating a lower platen element of the lower platen assembly disposed on an opposite side from the upper portion of the lower platen assembly such that the lower platen element remains sufficiently cool-to-the-touch when the upper portion of the lower platen assembly is heated to the operating temperature.

* * * * *